(12) United States Patent
McCormick et al.

(10) Patent No.: US 7,486,179 B2
(45) Date of Patent: Feb. 3, 2009

(54) LOW-LEVEL OIL SENSOR

(75) Inventors: Harold Edward McCormick, Ballwin, MO (US); Mark Murray, St. Charles, MO (US)

(73) Assignee: C-K Engineering, Inc., Ballwin, MO (US)

( * ) Notice: Subject to any disclaimer, the term of this patent is extended or adjusted under 35 U.S.C. 154(b) by 419 days.

(21) Appl. No.: 11/413,387

(22) Filed: Apr. 28, 2006

(65) Prior Publication Data

US 2006/0267751 A1  Nov. 30, 2006

Related U.S. Application Data

(60) Provisional application No. 60/676,658, filed on Apr. 29, 2005.

(51) Int. Cl.
 *B60Q 1/00* (2006.01)
(52) U.S. Cl. ............... 340/450.3; 340/450; 340/603; 340/612; 340/618; 340/623; 73/305; 73/307
(58) Field of Classification Search ............ 340/450, 340/450.3, 603, 612, 618, 623; 73/305, 307
See application file for complete search history.

(56) References Cited

U.S. PATENT DOCUMENTS

| 885,059 | A | 4/1908 | Laursen |
|---|---|---|---|
| 1,129,051 | A | 2/1915 | Crooks |
| 2,780,692 | A | 2/1957 | Hinojosa |
| 3,949,360 | A | 4/1976 | Pignata et al. |
| 4,386,337 | A | 5/1983 | Todd |
| 4,473,730 | A | 9/1984 | Ida |
| 4,564,834 | A | 1/1986 | Steele |
| 4,622,935 | A | 11/1986 | Janisch |
| 4,684,917 | A | 8/1987 | Tharman |
| 4,751,845 | A | 6/1988 | Peterson et al. |
| 4,791,400 | A | 12/1988 | Burks et al. |

(Continued)

FOREIGN PATENT DOCUMENTS

DE  101 63 881  12/2001

(Continued)

OTHER PUBLICATIONS

Ametek Aerospace, 8TJ209 Capacitive Oil Level Sensor, Engine Components and Accessories, 02/00/1987.

(Continued)

*Primary Examiner*—George A Bugg
*Assistant Examiner*—Samuel J Walk
(74) *Attorney, Agent, or Firm*—Gallop, Johnson & Neuman

(57) ABSTRACT

A low fluid sensor for an internal combustion engine. The sensor includes a base with helically threaded post and a float slidably mounted on the post. The float rotates about the post as it moves longitudinally along it. In the preferred embodiment, eccentric mounting of the assembly along with its lobe shape act in concert with the pitch of the screw threads and fluid viscosity to dampen the buoyant movement of the float against fluid turbulence. At a predetermined level a latch spring on the float contacts an ignition circuit terminal and grounds the engine ignition circuit. A catch holds the float at the pre-determined level, preventing engine starting, so that the sensor may only be reset by addition of fluid and re-insertion of the dipstick.

39 Claims, 18 Drawing Sheets

U.S. PATENT DOCUMENTS

| | | | |
|---|---|---|---|
| 4,984,543 | A | 1/1991 | Tharman |
| 4,986,228 | A | 1/1991 | Tharman |
| 5,196,824 | A | 3/1993 | Helm |
| 5,299,456 | A | 4/1994 | Steiner |
| 5,301,643 | A | 4/1994 | Garcyalny |
| 5,687,687 | A | 11/1997 | Trueblood et al. |
| 5,872,509 | A | 2/1999 | Kim |
| 6,041,650 | A * | 3/2000 | Swindler et al. .............. 73/317 |
| 6,239,709 | B1 | 5/2001 | Dykstra et al. |
| 6,433,560 | B1 | 8/2002 | Hansen et al. |
| 6,484,127 | B1 | 11/2002 | Langervik |
| 6,497,144 | B1 | 12/2002 | Lin |
| 6,497,145 | B1 * | 12/2002 | Ross, Jr. ....................... 73/305 |
| 6,498,566 | B1 | 12/2002 | Lin |
| 6,590,402 | B2 | 7/2003 | Wang et al. |
| 6,617,968 | B1 | 9/2003 | Odisho et al. |
| 6,975,216 | B2 | 12/2005 | Tharman et al. |

FOREIGN PATENT DOCUMENTS

| | | |
|---|---|---|
| JP | 57-200671 | 12/1982 |
| JP | 2003-141976 | 5/2003 |

OTHER PUBLICATIONS

Aircraft Extras, Inc., Low Level Oil SEnsor.

Standex Electronics, "Smart" Magnetic Fluid Level Sensor, 1998-2004.

Robert Bosch GmbH, Oil Condition and Oil Level Sensor SGM110, 2004.

* cited by examiner

LOW-LEVEL OIL SENSOR

CROSS-REFERENCE TO RELATED APPLICATION

This application claims the benefit of U.S. Provisional Application No. 60/676,658, filed on Apr. 29, 2005, which is hereby incorporated by reference in its entirety.

STATEMENT REGARDING FEDERALLY SPONSORED RESEARCH OR DEVELOPMENT

Not applicable.

SEQUENCE LISTING, TABLE, OR COMPUTER PROGRAM ON COMPACT DISC

Not applicable.

FIELD OF INVENTION

This invention relates to fluid level sensors. More particularly, this invention relates to lubricant level sensors for internal combustion engines.

BACKGROUND OF THE INVENTION

Small internal combustion engines, such as four stroke engines, are frequently found in consumer and light industrial products such as lawnmowers, electrical generators, powerwashers, snow throwers and lawn tractors. A common problem associated with consumer or jobsite use of these types of products results from the fact that many operators do not perform the easy, but necessary, periodic inspections of the engine to ensure it contains a sufficient level of oil for operation. In many cases, checking the oil level in an internal combustion engine such as is found on a consumer or jobsite product is as simple as extracting a dipstick from the engine and visually observing how far up the dipstick the oil wet line appears. A typical dipstick is engraved with a mark or marks that indicate the appropriate level of oil. In some cases, the dipstick is marked with the words "ADD" as an instruction to operators to add oil should the observed level of oil be found to be below a certain level mark on the dipstick.

Despite the fact that checking and adding to the oil level in an internal combustion engine is a relatively easy process, operators often fail to adequately maintain the necessary level of oil required by these engines. When an engine operator repeatedly fails to protect against or recognize a low level of oil in the engine, the engine will suffer premature wear. In extreme cases of neglect, catastrophic engine failure can result. It is therefore desirable to have a low-level fluid sensor built into the engine which will alert the operator via a visible or audible signal, or more preferably prevent or shut down operation of the engine, should the lubricant level fall to a dangerously low level.

The prior art discloses a variety of methods for indicating or responding to a low fluid level or condition. Some systems employ an indicator light that turns on when an engine fluid level or pressure drops below a predetermined value. In other systems, an audible alarm may be implemented such that the operator will hear the alarm upon attempting to start the engine. In other cases, the sensing system disrupts the engine ignition circuit and protectively shuts down the engine.

The typical four-cycle internal combustion engine found on a consumer or light industrial product utilizes a splash lubrication system to spread oil throughout the engine. Accordingly, in the past various types of mechanisms have been considered for use with splash lubricated engines to detect a dangerously low lubricating fluid level. Such prior art detecting mechanisms include pressure switches, capacitor switches, thermal switches and float-type sensors. Though pressure sensors have found effective application in industrial and automotive engines, and have even been proposed for use in splash lubricated engines, such sensors have been found not practical for use in consumer product engines. Capacitance, pressure and thermal switches generally are relatively costly and require an external power supply for operation. Additionally, oil capacitance may vary by several orders of magnitude based upon oil temperature and condition and the presence of oil additives and impurities.

A variety of float-type sensors have been proposed in the prior art. The simplest version involves slidably mounting a float on fixed linear guides and having an elongate flexible member pass through the center of the float. When the float moves along the length of the fixed linear guides due to its buoyancy, the flexible member is caused to twist. The top of the central flexible member is connected to a needle on a dial. The twisting action of the central flexible member is translated into a dial readout. In order for this prior art device to function, the float must be restricted from rotating about the central flexible member so that its only motion is vertical. This is accomplished through use of the fixed linear guides. Accordingly, these float-type sensors comprise additional structures, usually fixed linear guides, located at the perimeter of the float, that prevent the float from rotating.

In more recently proposed float-type sensors, the float is provided with a magnet or electrical contact. In one variant of this type of sensor, an electrical contact is attached to a float, which rides on the surface of the lubricant in the engine lubricant reservoir or crankcase. Due to its buoyancy, the float moves up and down directly with the level of the lubricant. As the lubricant volume drops so does the float. At a point in its vertical travel designated to represent a low lubricant level, the float's vertical travel will cause the electrical contact on the float to make contact with a circuit terminal. This terminal contacting action will sound an alarm or ground the engine ignition circuit.

In another variant of a prior art float-type sensor, a magnet is housed in the float. The float rides on the surface of the lubricant in the engine lubricant reservoir or crankcase. Due to its buoyancy, the float moves up and down directly with the level of the lubricant. As the lubricant volume drops so does the float. At a point in its vertical travel designated to represent a low lubricant level, the float's vertical travel will cause the float to pass a switch connected to a circuit. The switch is activated by proximity of the magnet. Activation of the switch will sound an alarm or ground the engine ignition circuit.

Though desirable, prior art float-type sensors systems exhibit several problems. First, they suffer from the fact that they are rather large and difficult to adapt to existing equipment and due to the substantial number of moving parts are not completely failsafe. Additionally, these sensors are susceptible to giving false readings particularly when used in conjunction with a splash lubrication system such as is found in a consumer product internal combustion engine. In a splash lubrication system, a slinger gear or paddle splashes lubricant throughout the engine housing while the engine is running. This can create lubricant level sensing difficulties when starting the engine. Upon engine start-up, much of the lubricating fluid is splashed throughout the engine housing. This may cause a temporary condition wherein the level of pooled lubricant in the reservoir is very low, yet the overall amount of engine lubricant is satisfactory.

The susceptibility of the prior art float-type sensor to register an erroneously low level of lubricant is not limited to situations of engine start up. Due to its buoyancy, the sensor float height varies as the lubricant level in the crankcase fluctuates. Such fluctuations may occur during normal engine operation, for instance in a lawnmower when the lawnmower is used on steep or undulating grade. Operating the lawnmower on such terrain causes the level of pooled lubricant in the reservoir or crankcase to vary substantially within the crankcase. This variance, in turn, causes the lubricant slinger or paddle to move varying and at times excessive amounts of lubricant from the reservoir to the engine housing, which may further exacerbate lubricant turbulence.

An external indicator or automatic shutdown feature on an engine or other mechanical device is desirable in order to avoid damage caused by an insufficiency of a vital fluid. In the case of a consumer product engine, the simple closure of a circuit such as would ground the ignition circuit is a cost effective and reliable way to avoid damage due to fluid insufficiency. However, if a prior art float-type sensor is utilized, fluid level variance may cause the circuit to be alternately closed and opened. This alternate interruption and restoration of ignition will cause the engine to misfire, which is objectionable from an emissions aspect and can also result in damage to the engine. Consequently, one problem with the float-type sensing system of the known prior art is that it may register a dangerously low level of lubricant (and erroneously ground the ignition circuit) even though the amount of lubricant in the engine is sufficient.

In an effort to avoid such errant low-level readings, engine manufacturers have devised various devices such as timer circuits to delay the indication of a low oil condition for a preset period of time due to engine starting or uneven terrain. A significant disadvantage of these time delay devices is that they typically require relatively complicated and expensive circuitry, which may not be feasible for internal combustion engines or other devices intended for consumer or light industrial use. Accordingly, there is the need in the art for a float-type low-level fluid sensor that accurately gauges engine lubricant level under start-up, normal operating conditions, and also during conditions of lubricant turbulence without the use of external electrical latching circuits.

SUMMARY OF THE INVENTION

The invention is directed to an improved float-type low-level fluid sensor for an internal combustion engine. The invention fulfills the need in the art by providing for an improved sensor that is mounted in a fluid reservoir of an engine and that is resistant to fluid turbulence. The sensor includes a base with a sidewall and a helically threaded post. A buoyant float is slidably mounted to the threaded post. The float includes a guide sleeve with internal projections that ride within the screw threads of the post. Buoyant forces imposed upon the float cause the float to move up and down along the threaded post in response to the fluid level in the reservoir. However, by virtue of the communication between the threads on the post and the projections on the float guide sleeve, the float is caused to rotate against the viscous fluid. As a result of this rotating action, the buoyant action of the float is dampened. It is therefore a feature and advantage of the present invention to use the communication between the threaded post and guide sleeve projections to rotate the float and dampen its buoyant action. In its preferred embodiment the float is a sandwich assembly of a lower housing, buoyant core and upper housing. Additionally, in its preferred embodiment, the float is lobe shaped and mounted eccentrically upon the threaded post in order to maximize the dampening of buoyant action.

It will be appreciated that the sidewall of the base provides further protection from reservoir fluid turbulence to the float. Accordingly, it is a feature and advantage of the present invention to use the sidewall to chamber the float and reduce the force of fluid turbulence acting against it. In the preferred embodiment the sensor is adapted to be secured in a pocket in the housing wall of the fluid reservoir. In this preferred embodiment, the base is shaped to form fit along the reservoir housing, allowing the sidewall to consist of a wall segment. This wall segment is directed toward the core of the fluid reservoir and shields the mounted float from reservoir fluid turbulence and the spraying action of the lubricant slinger. The base of the preferred embodiment includes a terminal post supporting a terminal contact connected to the engine ignition circuit. The sensor includes an electrically conductive latch spring with a first and second end. In a preferred embodiment, the latch spring is attached to the float in tangential fashion. The first end of the latch spring extends to and touches the reservoir housing, which is made of conductive metal. As noted, due to the communication between the threads of the threaded post and the internal projections on the sleeve of the float, the float rotates as it travels up and down the threaded post in response to the buoyant forces acting upon it. As the float rotates, the first end of the latch spring moves along the reservoir housing and remains in contact with it. When the float drops to a level predetermined to represent a dangerously low level of fluid, the second end of the latch spring will make contact with the terminal contact in the sensor base. When this contact occurs, the engine ignition circuit is grounded. In a combined or alternative arrangement, the terminal contact may be connected to an indicator circuit, such that the action of the latch spring contacting the terminal contact will activate the indicator circuit.

In another embodiment, the sidewall is a continuous perimeter wall, entirely enclosing the floor of the base and the mounted float. In this embodiment the sensor provides additional turbulence protection in the event it cannot be form-fitted within a pocket in the lubricant reservoir housing wall. In this embodiment the sensor base includes two terminal contacts: a first terminal contact connected to the ignition circuit and a second terminal contact connected to ground. An electrically conductive latch spring, with a first end and a second end, is attached to the float. In this embodiment, it is also preferred that the latch spring be attached to the float in tangential fashion. As noted, due to the communication between the threads of the base post and the internal projections on the sleeve of the float, the float rotates as it travels along the post in response to the buoyant forces acting upon it. When the float drops to a level predetermined to represent a dangerously low level of fluid, one end of the latch spring on the float will contact one of the terminal contacts in the sensor base. At the same time, the other end of the latch spring will contact the other terminal contact in the sensor base. As a result of this simultaneous contacting of the terminal contacts by the latch spring, the ignition circuit will ground and stop the engine. Accordingly, it is a feature and advantage of the present invention to use the rotational action of the float to close an ignition circuit and cause the engine to cease running. The sensor may be adapted such that in addition to, or as an alternative to, grounding the engine, the simultaneous contacting of the terminal contacts by the latch spring will cause an indicator circuit to activate and alert the operator to the low fluid condition. Accordingly, it is a feature and advantage of the present invention to use the rotary motion of the float to activate an indicator circuit and alert the engine operator of a low fluid condition.

It is a further feature and advantage of the present invention that the sensor will catch and hold the float when it reaches the pre-determined level. By catching and holding the float the ignition circuit will remain grounded and the sensor prevents the engine from re-starting. In a preferred embodiment, the sensor is positioned in the fluid reservoir such that it lies directly below the dipstick tube leading out of the fluid reservoir. When positioned in this fashion the axial centers of the threaded post of the walled base, as well as the guide sleeve of the float coincide with the approximate axial center of the distal end of the dipstick tube. As a result of this arrangement, when the dipstick is reinserted into the fluid chamber it will extend into the sensor. In a preferred embodiment the catching mechanism will hold the float in position even when additional fluid is added to the fluid reservoir and will only be freed when the float is reset by removing and reinserting the dipstick. Accordingly, it is a further feature and advantage of the present invention that the sensor float can be reset to respond to buoyant forces only when the engine dipstick is reinserted into the fluid reservoir.

The invention provides a simple, mechanical low cost sensor that is self-powered and has a reduced likelihood of failure. The sensor occupies a minimum amount of space in the fluid reservoir and is readily adaptable to a broad range of internal combustion engines and can be used in other fluid containing devices. These and other features and advantages of the present invention will be apparent to those skilled in the art from the following description of the preferred embodiment and the drawings.

DETAILED DESCRIPTION OF THE INVENTION

Figure 1:
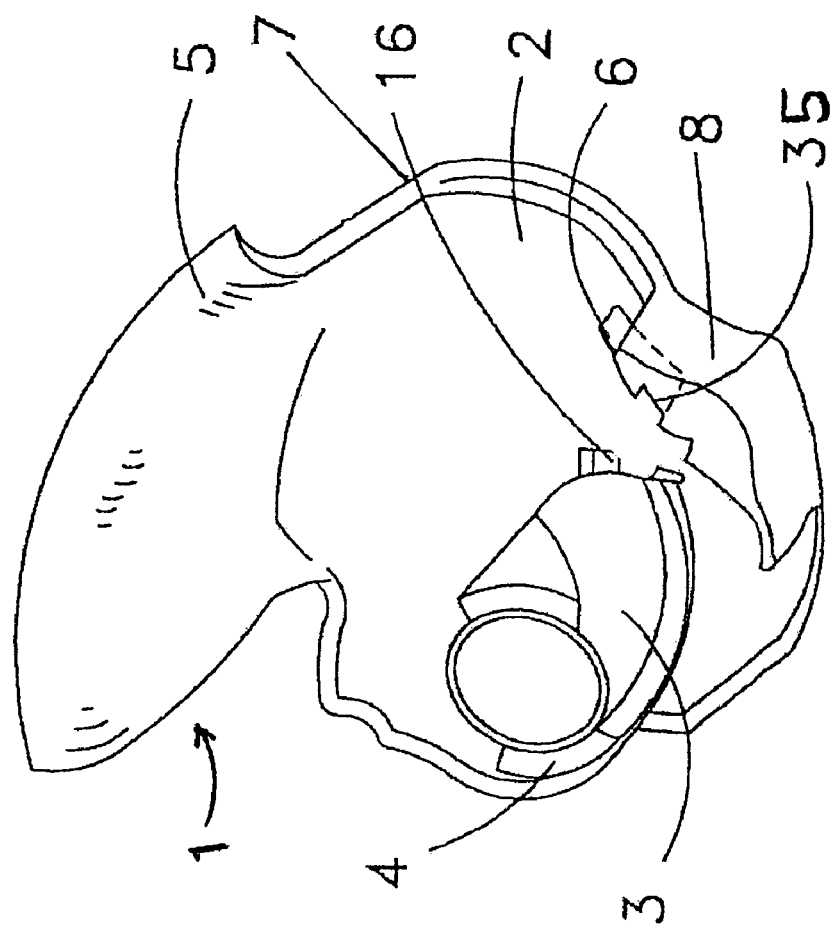
FIG. 1 is a perspective view of a preferred embodiment base of the present invention showing the threaded post and sidewall.

Before embodiments of the invention are explained in detail, it is to be understood that the invention is not limited in its application to the details of the examples set forth in the following description or illustrated in the drawings. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "mounted," "connected," and "coupled" are used broadly and encompass both direct and indirect mounting, connecting, and coupling. Further, "connected" and "coupled" are not restricted to physical or mechanical connections or couplings.

Figure 2:
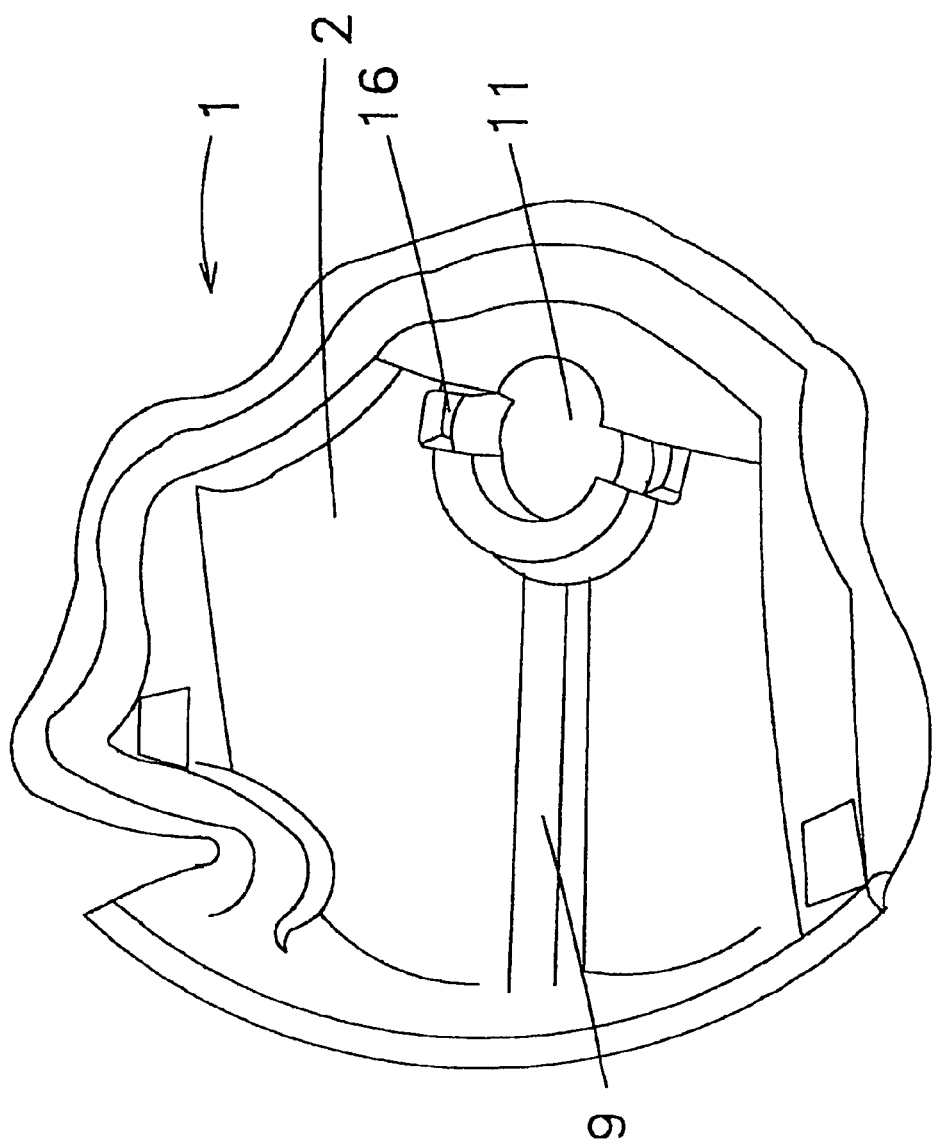
FIG. 2 is a perspective view of a the underside of the preferred embodiment base of FIG. 1.

FIG. 1 is a perspective view of the walled base 1 of the low-level fluid sensor of the present invention. Walled base 1 includes a floor 2, threaded post 3 with helical threads 4, sidewall 5, terminal contact 6 and terminal post 8. In the preferred embodiment, threaded post 3 is shaped in the form of a hollow cylinder. Post 3 projects upward from floor 2 in a relatively perpendicular arrangement. Post 3 is adapted to receive a float 20, embodiments of which are described in FIG. 3, FIG. 4, FIG. 12 and FIG. 13. Sidewall 5 projects in relatively perpendicular fashion from the perimeter 7 of floor 2. The underside of base 1 can be seen in FIG. 2. Ribs 9 project downward from the bottom of floor 2 and serve to add strength to the base 1, elevate it from the floor of the fluid reservoir and provide a guide 11 for resetting member 12 (shown in FIG. 11). In the preferred embodiment walled base 1 is constructed of heat resistant Nylon 6.

Figure 3:
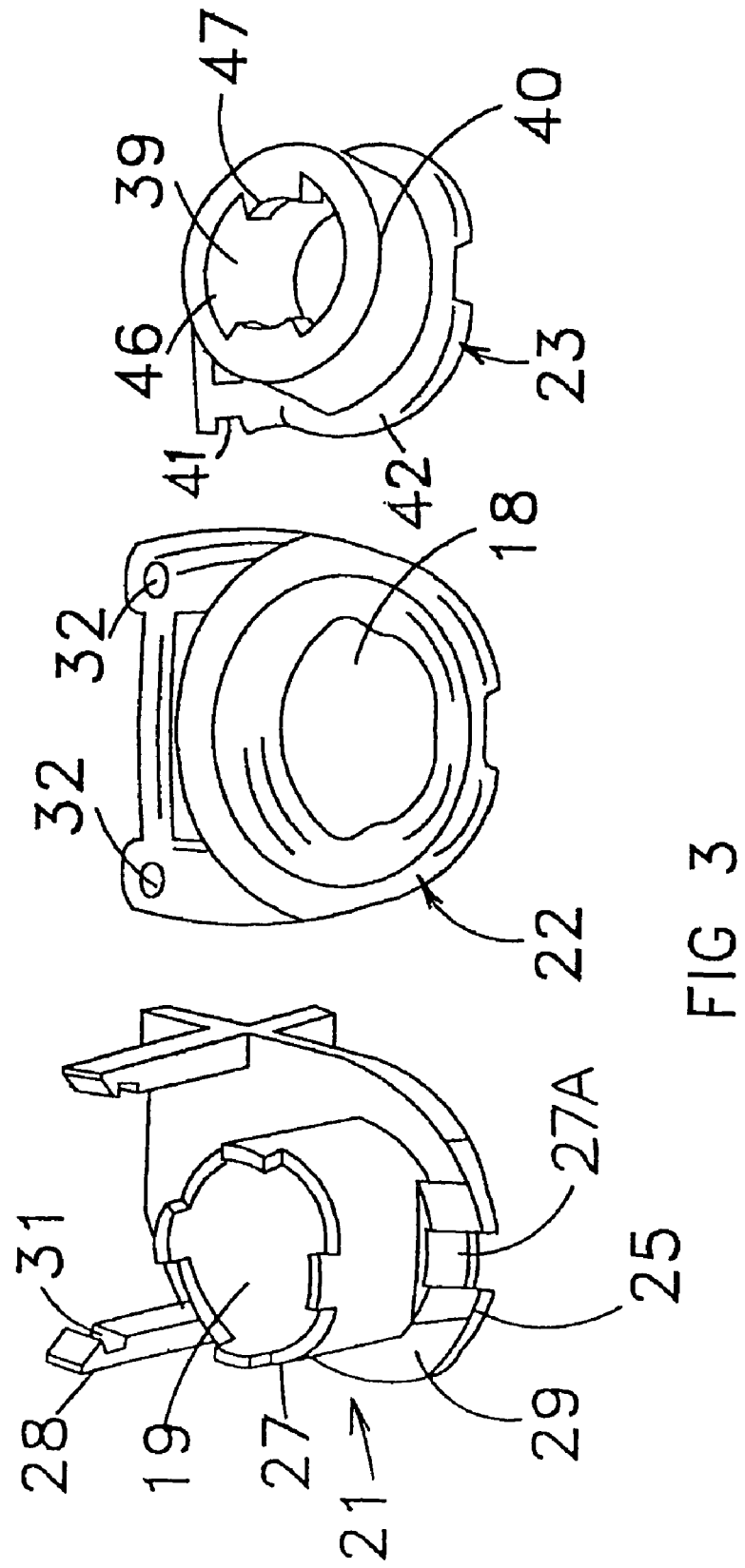
FIG. 3 is a perspective view of the components (lower housing, core and upper housing) of a preferred embodiment float of the present invention.

Float 20 may be manufactured out of a buoyant material rigid enough to allow it to translate upon a threaded post. It may be constructed of a single material or it may be of composite construction. For applications as an engine oil sensor, float 20 should be heat resistant. FIG. 3 depicts the separate components of a preferred embodiment composite sensor float 20. Float 20 is comprised of a lower float housing 21, a core 22 and an upper float housing 23. In the preferred embodiment the lower housing 21 and upper housing 23 are constructed of heat resistant Nylon 6. In structure, the lower float housing contains a base footing 25 with a circular bore 19. Cylindrical guide sleeve 27 and one or more retention posts 28 project in relative upward perpendicular fashion from the upper face 29 of the base footing 25. The top of each retention post 28 contains a retaining notch 31. Guide sleeve 27 projects from the upper face 29 of the base footing 25 and is superimposed over bore 19. Accordingly, circular bore 19 and guide sleeve 27 have equal radial dimensions.

Core 22 is adapted to overlay lower float housing 21. In the preferred embodiment core 22 is shaped so as to allow guide sleeve 27 to pass through it. In this regard, core 22 contains a circular bore 18 with radial dimension sufficient to allow guide sleeve 27 to pass through it. Core 22 is also shaped to allow retention posts 28 to pass through or around it. When placed on top of and on to lower float housing 21, circular bore 18 receives guide sleeve 27. Retention posts 28 prevent core 22 from twisting around guide sleeve 27. Accordingly, core 22 is adapted with holes 32 to receive retention posts 28. These holes 32 are sized and arranged, so as to allow the retention posts 28 to pass through holes 32. In the preferred embodiment core 22 is made of a highly buoyant material such as nitrophyl or the like. It will be appreciated that the arrangement of holes 32 depicted on core 22 in FIG. 3 merely represents one embodiment of the construct of the core 22. Subject to buoyancy constraints and the arrangement of retention posts 28, core 22 can be constructed so as to have any number or arrangement of holes 32 or notches to receive retention posts 28.

Upper float housing 23 has a pressing base 42 with circular bore 39. Projecting into the interior of bore 39 are internal projections 47. Guide sleeve 40 is superimposed over bore 39 and projects in relative perpendicular fashion from pressing base 42. In the embodiment shown, projections 47 extend up on to the surface of interior wall 46 of guide sleeve 40.

Figure 4:
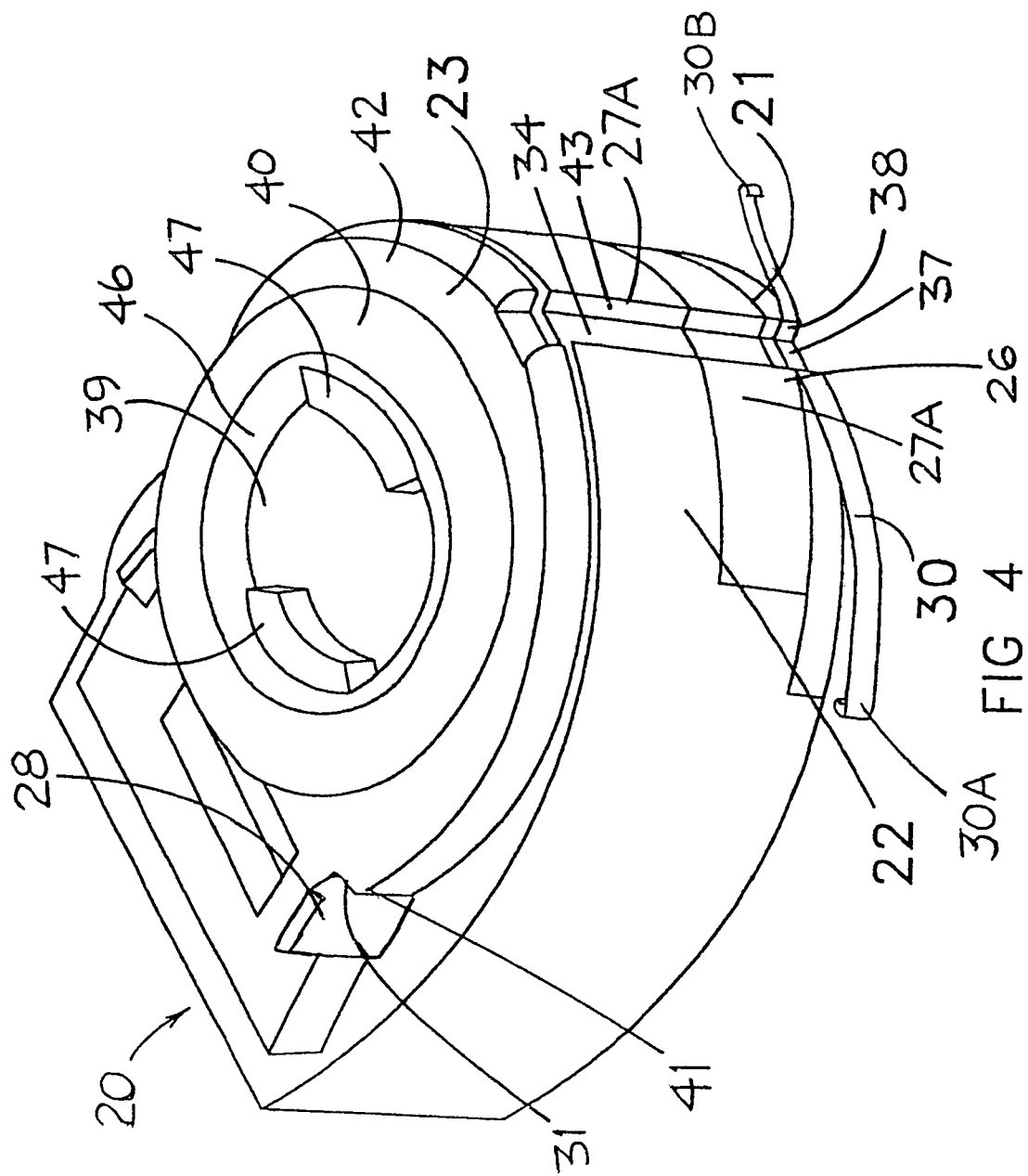
FIG. 4 depicts the components of FIG. 3 assembled as a float.

Lower float housing 21 with core 22 on it receives and retains upper float housing 23. In this arrangement core 22 is sandwiched between lower float housing 21 and upper float housing 23 and guide sleeve 40 is positioned above and coaxially with the guide sleeve 27 of the lower housing 21. FIG. 4 depicts an assembled float 20 and demonstrates this sandwich arrangement. When pressed into place in this arrangement, notches 41 in pressing base 42 of the upper housing 23 receive retention posts 28 from the lower housing 21. When sandwiched between the upper housing 23 and lower housing 21, core 22 exerts an upward pressure on the pressing base 42 of upper housing 23. This upward pressure is opposed by the inside top of notches 31 at the top of the retention posts 28 allowing the upper housing 23 to be retained against core 22 and lower housing 21. Retention posts 28 further hold upper housing 23 to the lower housing 21 by means of spring force exerted by the retention posts.

As shown in FIG. 4, a latch spring 30, with ends 30a and 30b is attached in relative tangential arrangement to a perimeter portion 26 of guide sleeve 27 of lower float housing 21. Latch spring 30 may be constructed of any flexible conductive metal including steel or copper. In the preferred embodiment, latch spring 30 is constructed of SAE 1070/1090 spring steel, but any flexible, resilient and conductive metal or metal alloy may be used. Any conventional attaching means including adhesives, integral molding and mechanical fasteners can be used to attach the latch spring to lower float housing 21. One such means is demonstrated in the embodiments shown in FIGS. 3-4 and FIGS. 12-13. In these figures, an embossed portion 27a of guide sleeve 27 is provided with a channel 34 whose sides 43 are undercut. A plateau 37 (also shown in FIG. 8) whose height approximates but does not exceed the depth of channel 34 and whose width approximates that of the width of the channel at its bottom, is formed in latch spring 30. When plateau portion 37 is pressed into channel 34, latch spring 30 is held by lower float housing 21 due to the spring force exerted by plateau sides 38 against channel sides 43.

Figure 5:
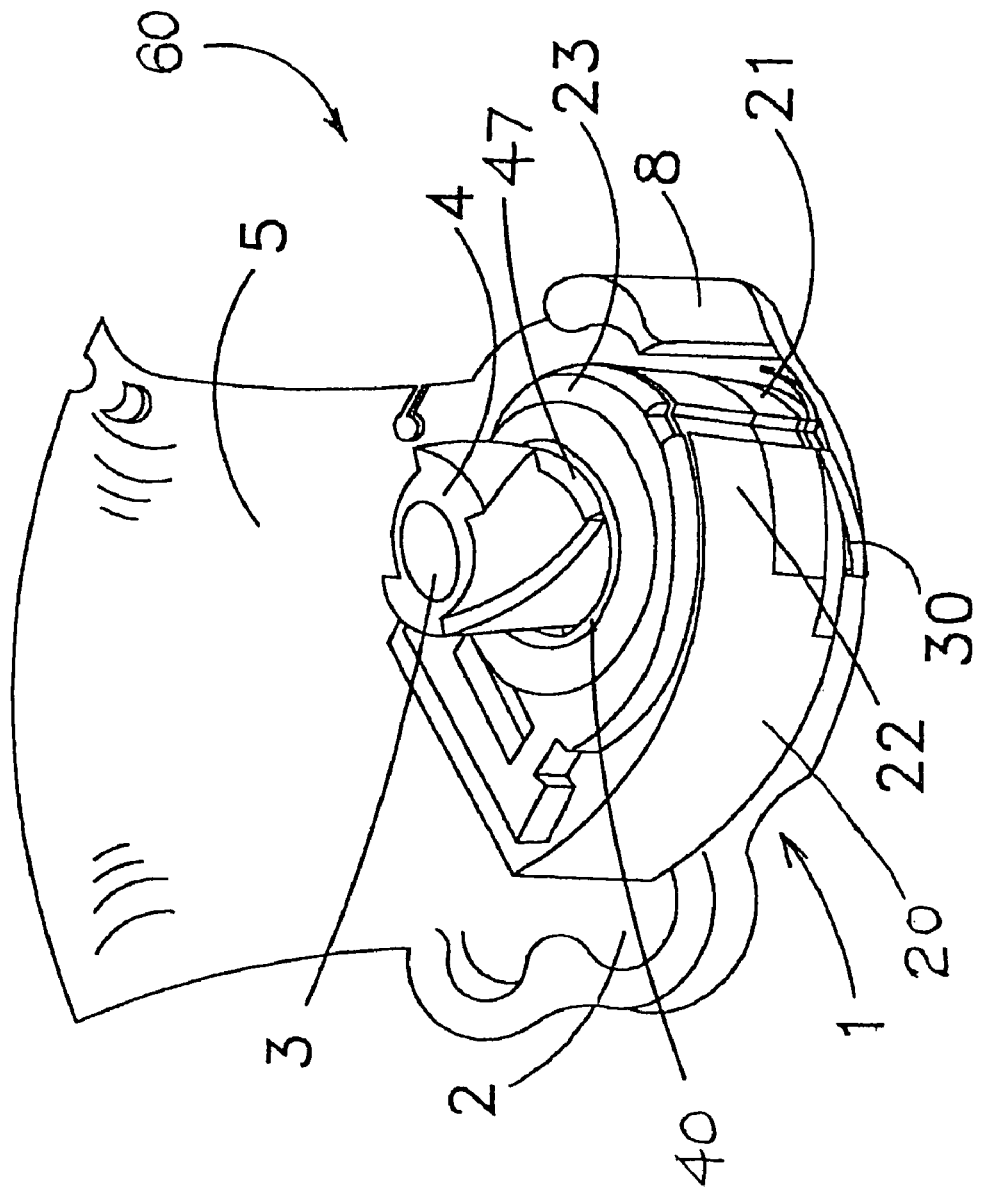
FIG. 5 depicts the assembled sensing unit comprised of the float mounted to the base.

Once the lower float housing 21 with latch spring 30, core 22 and upper float housing 23 are assembled in the fashion described above, the entire float 20 is placed onto the walled base 1 to complete the sensing unit. FIG. 5 depicts the assembled sensing unit 60 comprised of the float 20 mounted to the walled base 1. The interior wall 46 of guide sleeve 40 contains projections 47 that are adapted to ride between or within the threads 4 of post 3. Through experimentation it has been found that float 20 moves optimally along threaded post 3 when the sides of projections 47 are pitched to match the pitch of the screw threads 4 and the width of each projections is slightly less than the distance between threads. Float 20 is placed onto walled base 1 by inserting threaded post 3 through guide sleeve 27 and on into sleeve 40. When mounted in this fashion, threaded post 3 slidably receives float 20 such that float 20 may slide along the length of threaded post 3. By virtue of projections 47 on guide sleeve 40 contacting the threads 4 of post 3, when float 20 moves along (up and down) post 3 it is caused to rotate. Accordingly, it is to be appreciated at this point that sidewall 5 of base 1 is distanced from threaded post 3 so as to allow float 20 to freely rise and fall along post 3 and also freely rotate about threaded post 3 without interference from wall 5.

Figure 6:
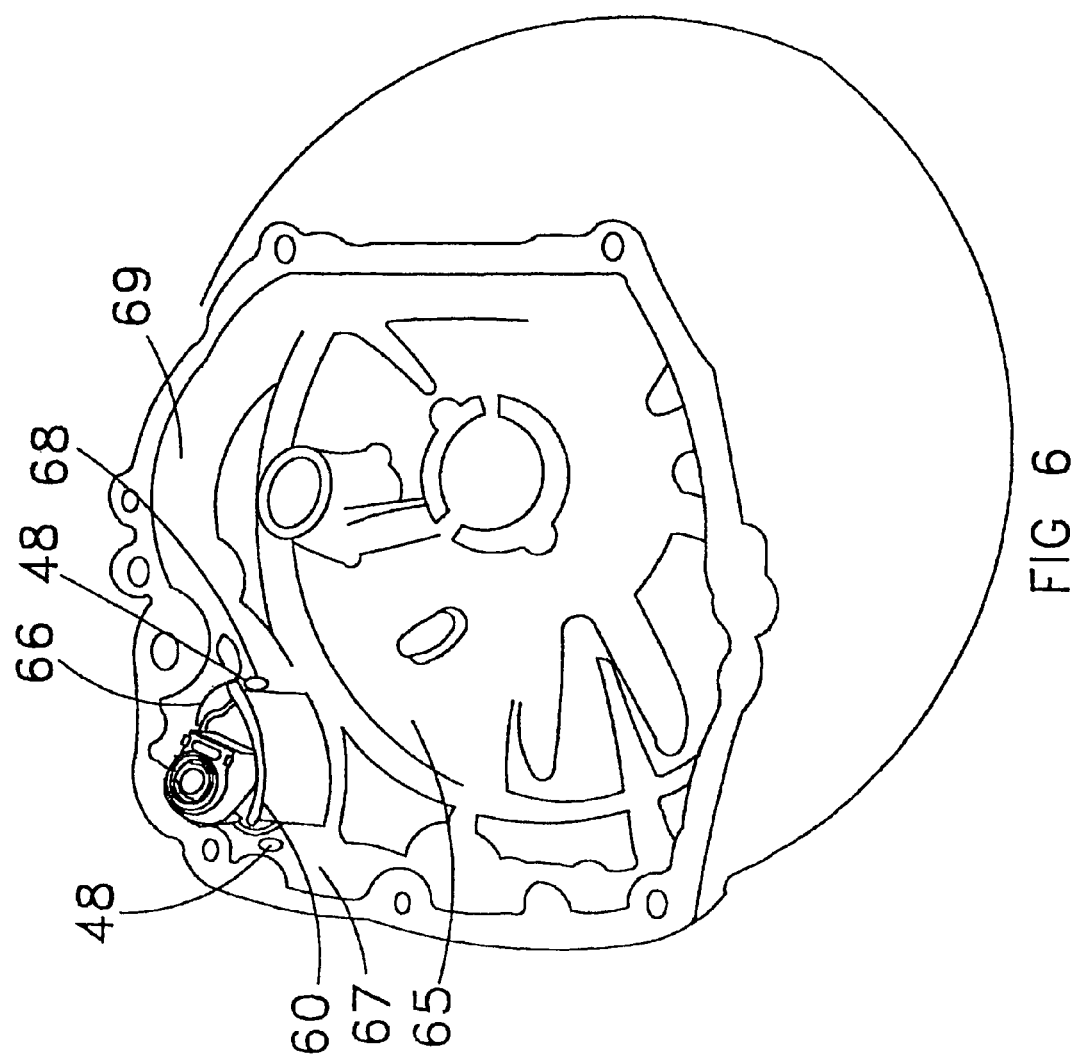
FIG. 6 depicts the sensor of the present invention as installed in the sump of an internal combustion engine.
Figure 7:
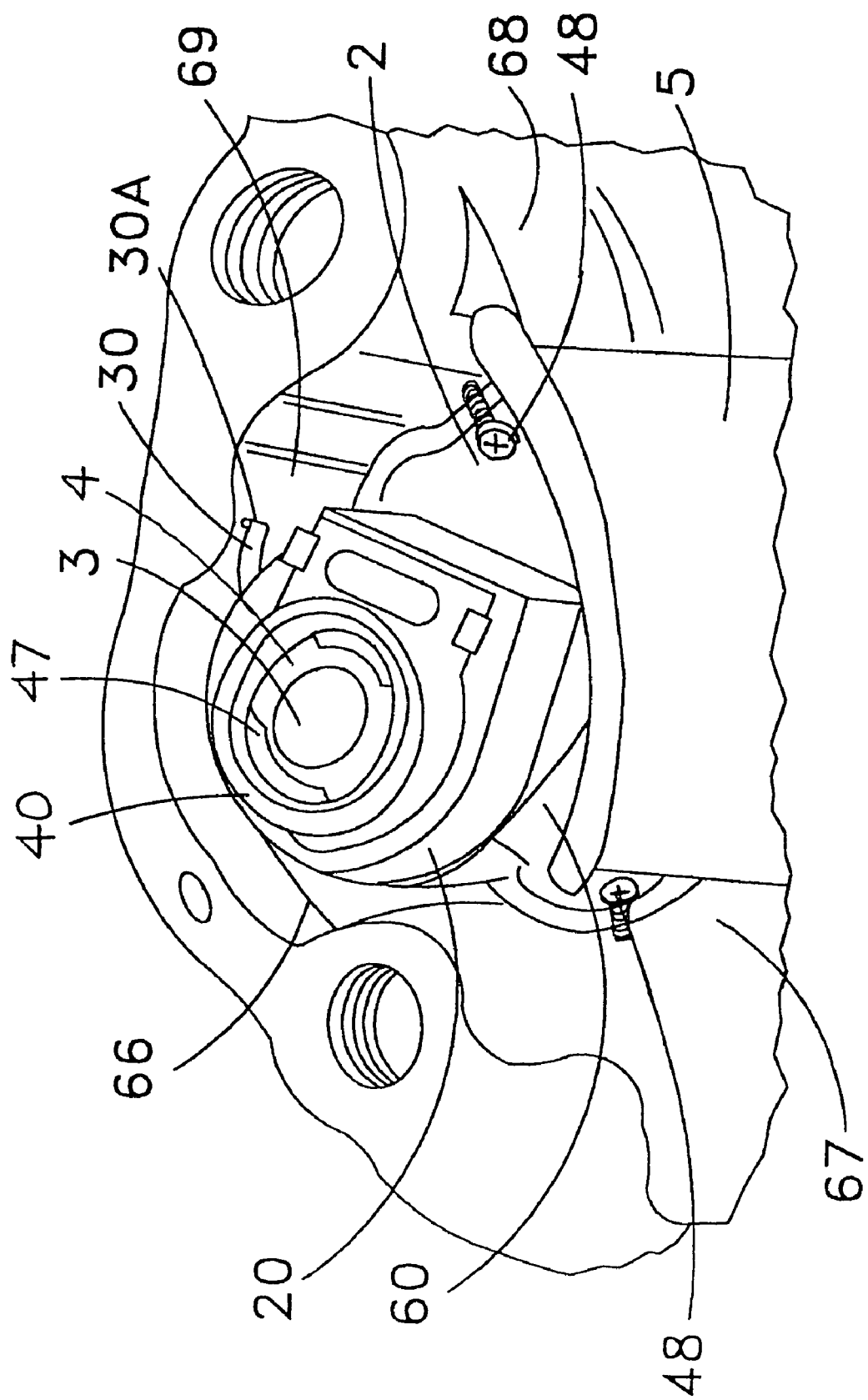
FIG. 7 is an enlarged view of the sensor of the present invention form-fittingly installed in a pocket in a sump wall of an internal combustion engine.

FIG. 6 depicts the sensing unit 60 installed in the lubricating fluid reservoir 65 of an internal combustion engine. FIG. 7 shows a close-up view of this installation. As is seen from FIG. 6 and FIG. 7, in the preferred embodiment, floor 2 of the sensing unit 60 is contoured to fit in a pocket 66 in the wall of reservoir 65. In this arrangement, sidewall 5 is sized to allow fluid from the reservoir to enter pocket space 66 via openings 67, 68 and act upon the float. However, by virtue of its size and arrangement, sidewall 5 protects float 20 from direct impact from turbulent fluid, including spray from the slinger, emanating from the inner portion of the fluid reservoir 65. The sensing unit 60 can be secured to the fluid reservoir 65 by conventional mounting means, including epoxy, adhesive material or the depicted hold-down screws 48 in FIG. 7. Other attachment means could include providing an edge projection or lip to the base and securing the sensing unit in the reservoir via an undercut in the reservoir housing wall, which would allow the unit to be snapped into place.

When the sensing unit 60 is installed in a fluid reservoir 65 in the depicted fashion, end 30a of latch spring 30 projects tangentially from the lower housing 21 of the float 20 and contacts with the metal wall 69 of the fluid reservoir 65. By virtue of its conductivity metal wall 69 serves as a second terminal contact. Due to its buoyant property the float 20 slides axially up and down the post 3 as the level of fluid in the fluid reservoir 65 rises and falls. As the buoyant float 20 slides along post 3, the internal projections 47 of guide sleeve ride between and along threads 4 of the post 3 causing the float 20 to rotate about the threaded post 3. By providing for this rotational motility the sensor operates to dampen the forces caused by fluid turbulence that may act upon the sensor. This dampening action occurs in several respects. First, by being allowed to freely rotate in the lubricating fluid, the viscous qualities of the lubricating fluid act as a drag upon the float 20 and oppose its rotational motion. Secondly, by making float 20 lobe-shaped the profile of the float 20 is increased, thus increasing the dampening effect of engine oil viscosity upon the rotation of the assembly 20. As a result, the float will not react as violently to oil level changes in the reservoir as would a float that was centered on the post. Thirdly, by varying the pitch of the threads on the post (and correspondingly on the projections 47 of guide sleeve 40 the degree of rotational movement caused by buoyant travel of the float can be modulated. The greater the thread pitch, the less rotation the float will undergo per vertical movement on post 3. In prototype sensors with float assemblies constructed of the disclosed Nylon 6 housings and nitrophyl floats, and having dimensions allowing installation of the sensor in a consumer or light industrial product engine, it was found that a ratio of 0.2032 centimeters (0.008 inches) of vertical travel per one degree of float rotation acts optimally to allow dampening of turbulent forces while providing the mechanical leverage necessary to rotationally move the latch spring. In these prototypes, it was found that approximately 27 degrees or 0.54864 centimeters (0.216 inches) of vertical motion were required to move the latch switch from an open to a closed position.

While float 20 rotates about threaded post 3, end 30*a* of latch spring 30 moves along and remains in contact with reservoir wall 69. FIG. 7 shows this arrangement. When the float 20 drops to a point along post 3 pre-determined to represent a dangerously low level of fluid in the reservoir, end 30*b* (shown in FIG. 8) of latch spring 30 contacts terminal contact 6. Terminal contact 6 may be connected to the engine ignition circuit via conventional circuitry or wiring. Accordingly, at the pre-determined point designated to represent a dangerously low level of fluid, the engine ignition circuit becomes grounded by virtue of end 30*a* of electrically conductive latch spring 30 being in contact with the metal fluid reservoir housing. When this ignition circuit grounding occurs, the engine will stop.

Figure 8:
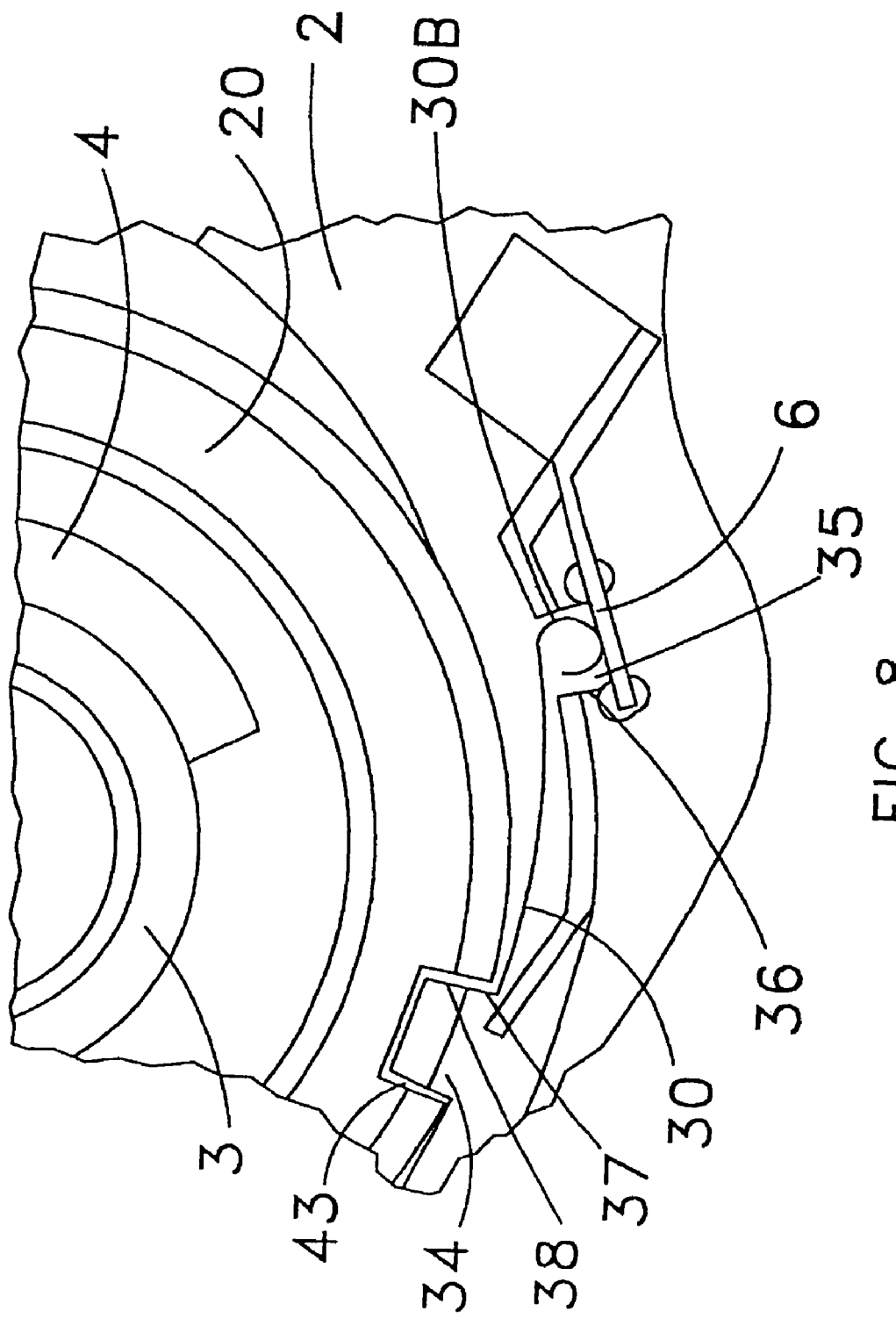
FIG. 8 shows an embodiment of the catching and holding mechanism of the present invention.

It is an objective and advantage of the present invention that when the float drops to the pre-determined level, the sensor will catch and hold the float preventing it from rising again until additional oil is added to the engine and the sensor is reset. FIG. 8 shows an embodiment of the catching and holding mechanism of the present invention. By catching and holding the float the ignition circuit remains grounded and the engine is prevented from re-starting, absent the intervention of the operator as hereinafter described. In the embodiment shown and described, the sensor holds the float in the following manner. As float 10 moves freely along post 3, latch spring 30 orbits post 3 as float 20 rotates. It is a feature and advantage of the present invention that threads 4 are located on post 3 such that such that when latch spring end 30*b* makes contact with terminal contact 6, float 20 will hit floor 2. In this fashion, not only is float 20 is restricted from further downward movement along post 3, its descent-based rotational movement is also restricted. Accordingly, by restricting the downward movement of float 20 latch spring end 30*b* is prevented from rotating past terminal contact 6. The design of the sensor also prevents float 20 from ascending from its caught position.

Referring to FIG. 8, in the preferred embodiment, terminal contact 6 resides in vertical channel 35 of terminal post 8. Latch spring end 30*b* can be bent, curled or provided with a bead such that when float 20 reaches the level pre-determined to represent a dangerously low level of fluid, end 30*b* slides across and "drops" into the channel by virtue of the spring action of the latch spring. Once end 30*b* drops into channel 35, the float 20 is constrained against upward movement by buoyant forces. This is because buoyant force will cause the float to ascend post 3 and undergo ascent-based rotation due to the communicating action between the threads 4 and projections 47. However, such ascent-based rotation will cause end 30*b* to strike the inside wall 36 of post channel 35, which in turn stops the rotational movement and consequent ascent of the float 20. As simple buoyant forces are not sufficient to overcome the barrier resistance of inside wall 36 against end 30*b*, float 20 is thereby caught by the sensor. While float 20 is in this caught position the ignition circuit remains grounded and the engine is restricted from restarting. The sensor can only be reset via the application of an additional lifting force imparted to the float. It is therefore an object and advantage of the present invention that the sensor will hold the float in position until the float is reset to its free-floating state.

Figure 9:
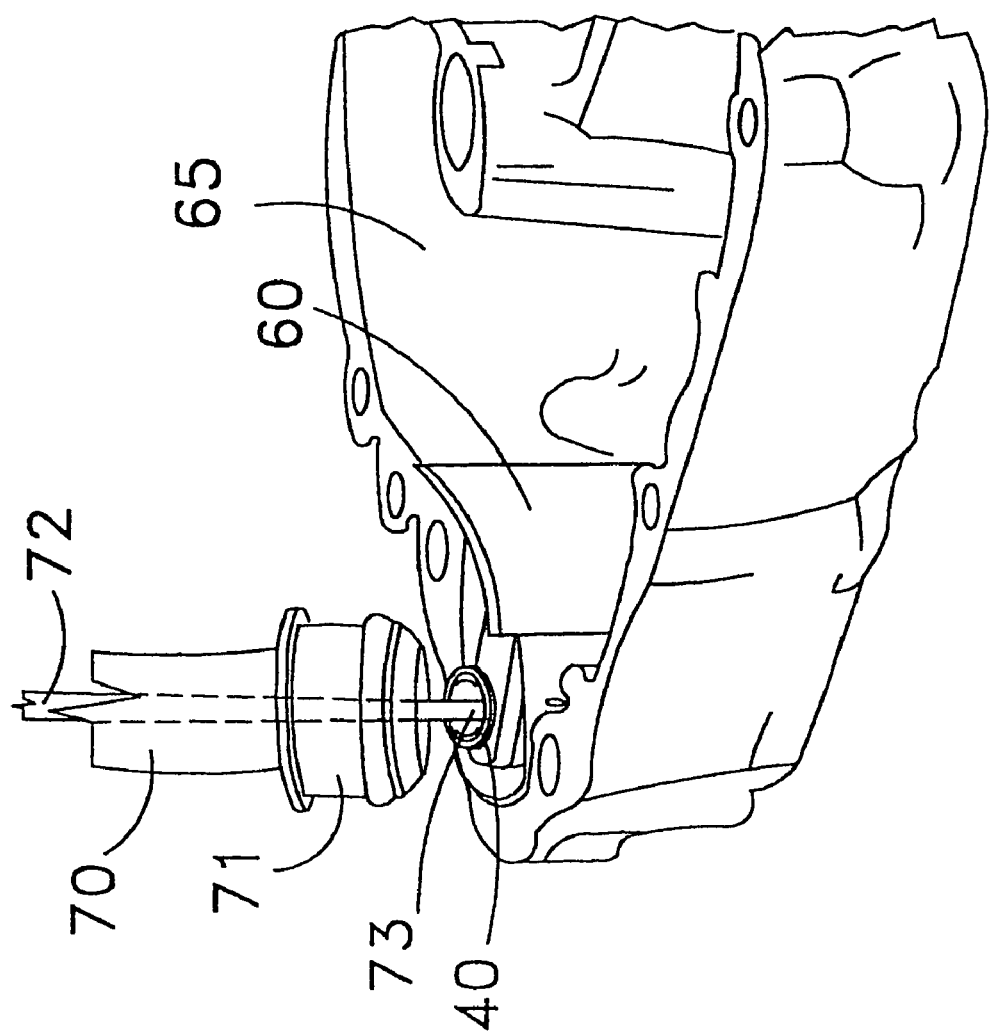
FIG. 9 shows a schematic of the orientation of the sensor, dipstick and dipstick tube as installed in an internal combustion engine.
Figure 10:
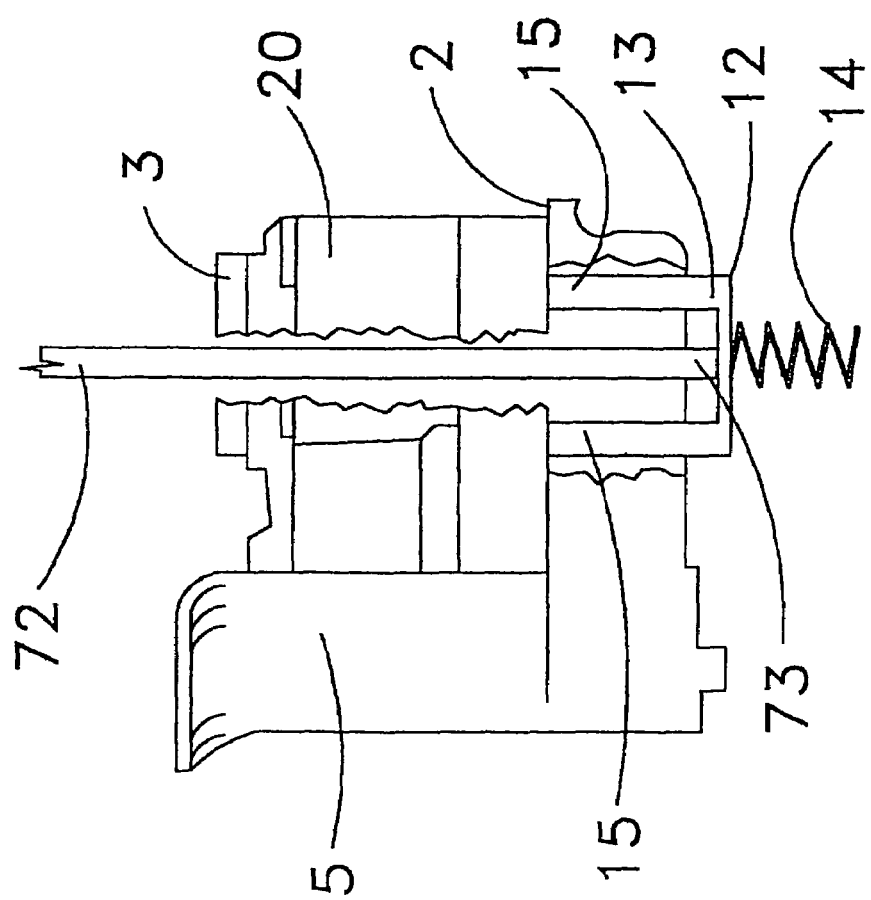
FIG. 10 shows the arrangement of the sensor and the resetting mechanism.
Figure 11:
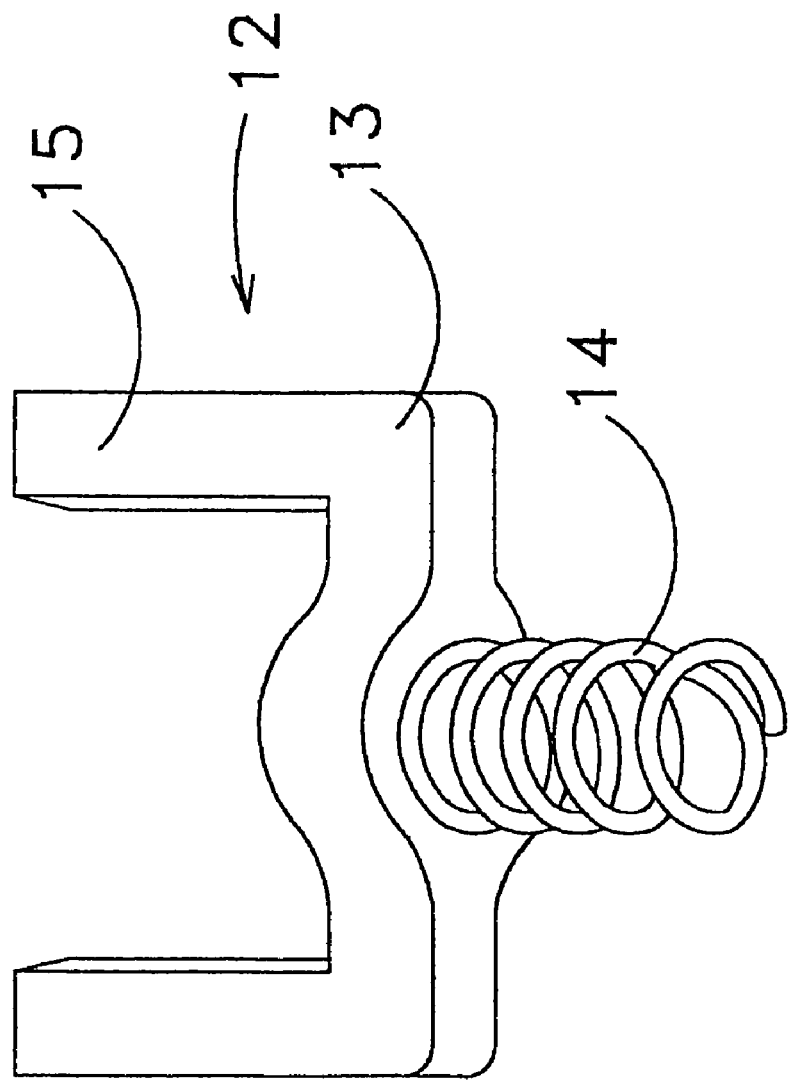
FIG. 11 depicts the resetting member.

FIGS. 9-11 explain the sensor resetting mechanism in the already described embodiment. FIGS. 9 and 10 depict the arrangement dipstick tube, dipstick and sensor as installed in an engine. In the disclosed preferred embodiment, the assembled sensing unit 60 is positioned in the fluid reservoir 65 such that it lies directly below the dipstick tube 70 leading out of the fluid reservoir. When positioned in this fashion the axial centers of the threaded post 3 of the walled base 1 and the guide sleeves 27, 40 of the float 20 coincide with the axial center of the distal end 71 of the dipstick tube 70. By virtue of this alignment, when the dipstick 72 is inserted into the dipstick tube 70 it will pass into the fluid reservoir 65 and extend into the sensor 60. Specifically, the distal end 73 of inserted dipstick 72 will pass through guide sleeve 40 of the upper housing 23 of the float 20, through guide sleeve 27 of the lower housing 21 and on into the interior of hollow threaded post 3.

FIG. 10 depicts the sensor in arrangement with its resetting mechanism. Near the bottom of threaded post 3, end 73 will contact resetting member 12. Resetting member 12 comprises a fork 13 mounted upon a spring 14 and is positioned below post 3 underneath floor 2 such that tines 15 project upward and through floor 2 via communicating guide holes 16 (shown in FIGS. 1 and 2) located on the sides of post 3. FIG. 11 depicts resetting member 12. Once distal end 73 makes contact with resetting member 12, the continued insertion of the dipstick 72 presses resetting member 12 pressed down toward the reservoir floor, thereby compressing spring 14. Removing dipstick 72 allows fork 13 to be pushed up by expanding spring 14. When this occurs, tines 15 pass up from the floor 2 and into the space above it.

In the case where the sensor recognizes a low oil condition, float 20 will descend post 3, the engine ignition circuit will ground and the float 20 will be caught by the sensor retention mechanism. The engine operator will then remove dipstick 72 in order to visually check the level of oil on the dipstick and confirm that the engine shut-off is due to activation of the sensor. It will be appreciated that in the case where the float has dropped to its low point coinciding with an engine-grounding or alarm-activating position, removing the dipstick 72 automatically causes resetting member 12 to rise, resulting in tines 15 pressing upward upon the bottom of floor 2 and lifting float 20 from its caught position. However, until such time as sufficient fluid is added to reservoir 65, float 20 will rest upon tines 15. Once additional fluid is added, dipstick 72 is reinserted down dipstick tube 70 and upon full insertion depresses resetting member 12. Once resetting member 12 is fully depressed, tines 15 will descend below floor 2 and float 20 is able to float freely on the newly added fluid and respond to fluid level changes.

Figure 12:
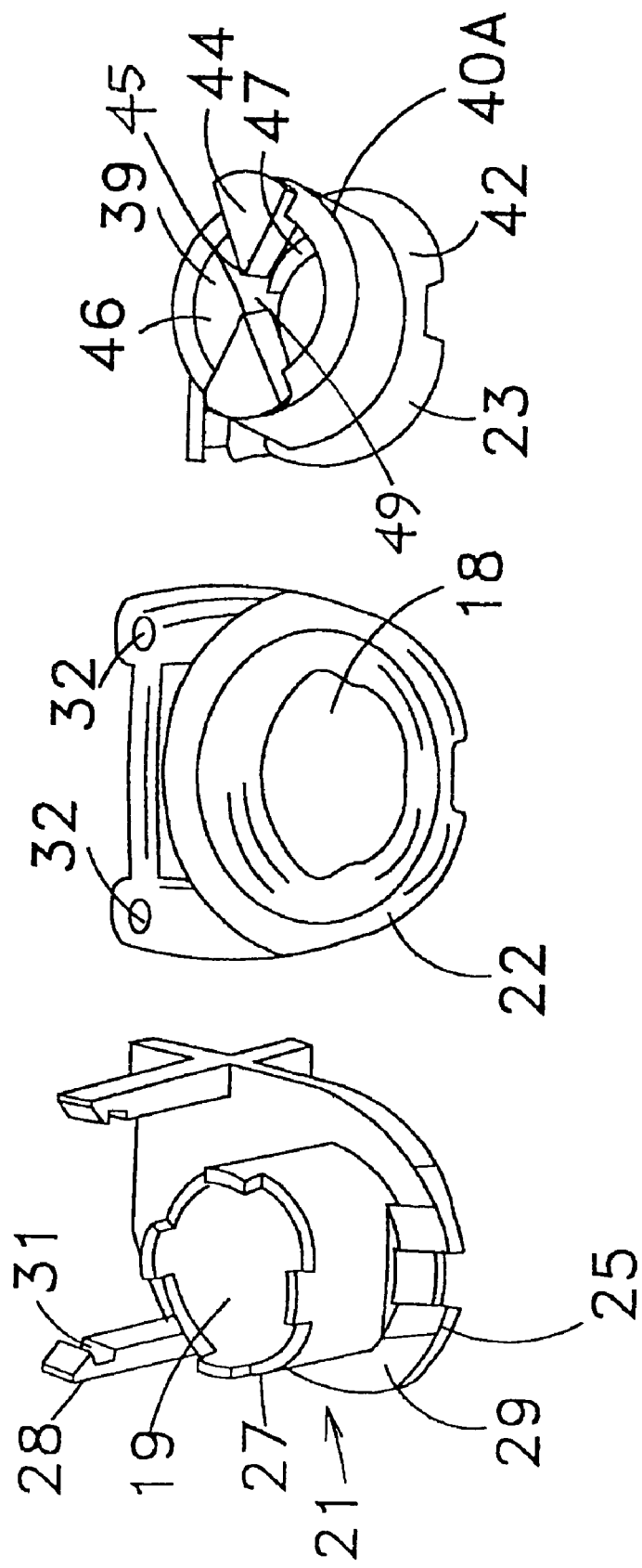
FIG. 12 is a perspective view of the components (lower housing, core and upper housing) of another embodiment float of the present invention.
Figure 13:
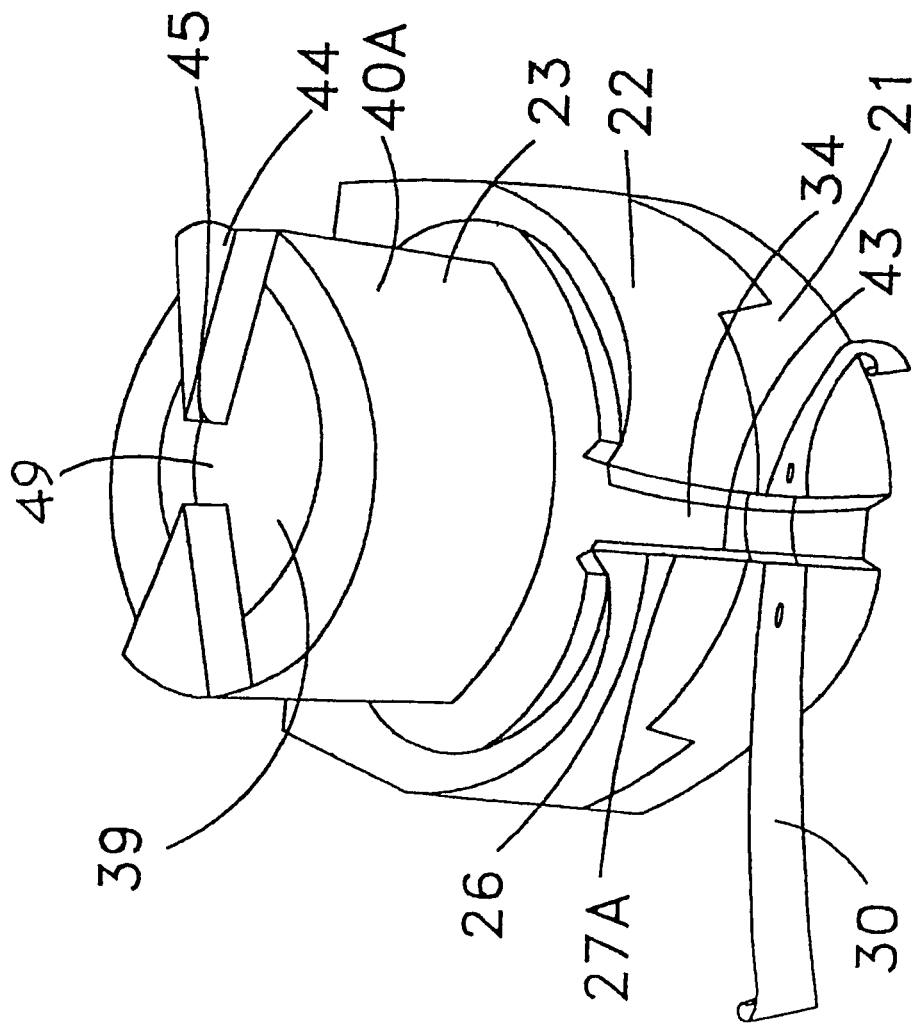
FIG. 13 depicts the components of FIG. 12 assembled as a float.

The sensor resetting mechanism described above can operate in engines whose dipsticks are inserted and held in place by either a simple press-down or screw-down action. FIGS. 12 and 13 depict an embodiment of the sensor of the present invention with features specially designed to take advantage of engines having screw-down or twist-in-place dipsticks. The sensor and float of this embodiment is identical in all respects to the embodiment described above, except as to the structure and operation of the resetting mechanism and requirement of a modified dipstick 72*a* (shown in FIG. 14). In this regard guide sleeve 40*a* on upper float housing 23 is elongated and provided with tabs 44. Tabs 44 with tab ends 45 are situated at the top of sleeve 40*a* and project over the interior of the bore 39 of sleeve 40*a* such that tab end 45 are separated by a space 49 less than the width 79 of dipstick 72*a*.

Figure 14:
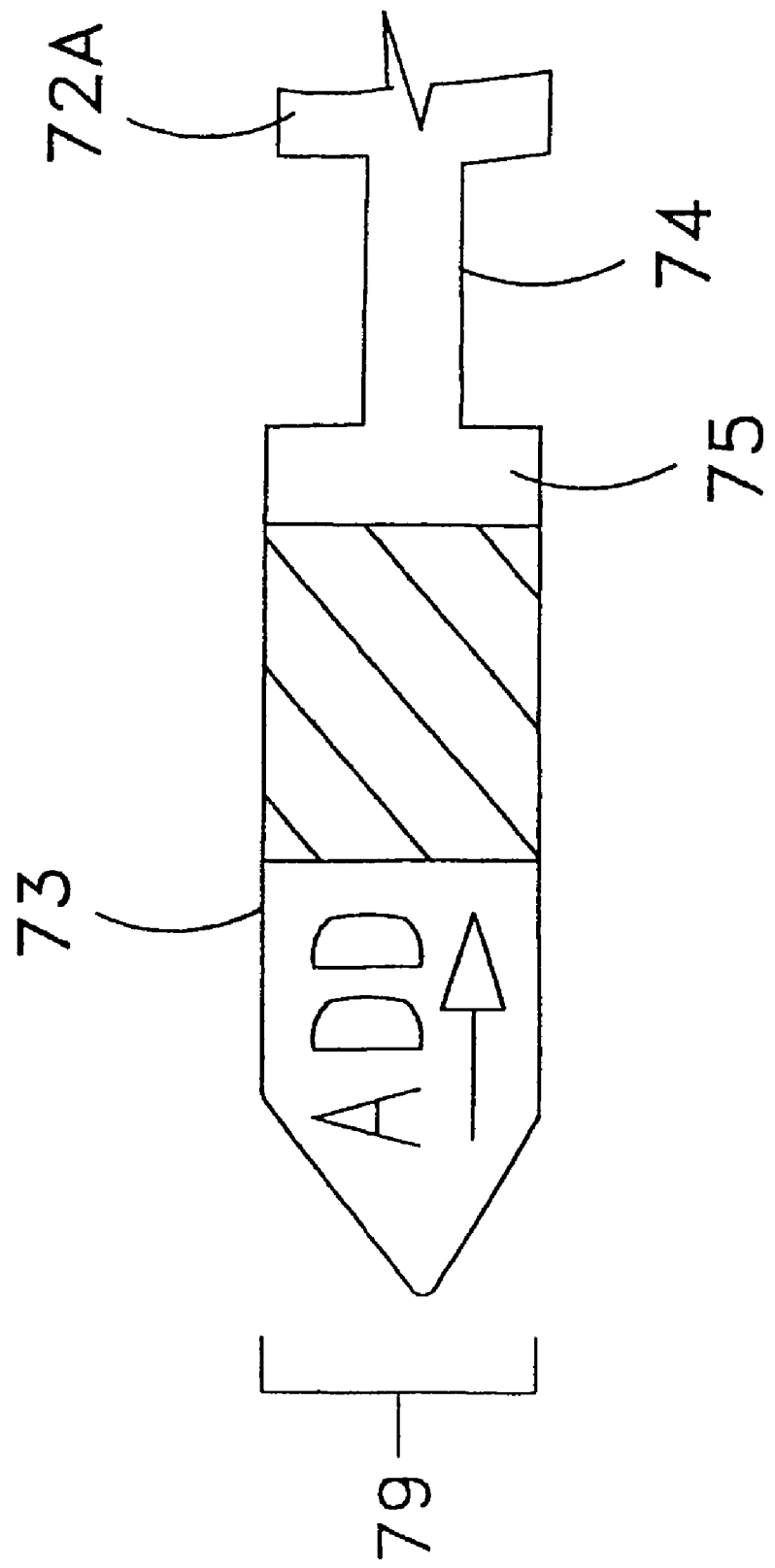
FIG. 14 shows the modified dipstick adapted for used with the embodiment of the float of the present invention shown in FIGS. 12 and 13.

When dipstick 72a is inserted into position it enters into guide sleeve 40a and will pass tabs 44 at the top of guide sleeve 40a. Tab ends 45 project over bore 39 and toward space 49 partially occupied by the dipstick 72a. As shown in FIG. 14, distal end 73 of dipstick 72a is adapted with notches 74. The handling end (not shown) of dipstick 72a is provided with a conventional screw-down cap to secure the dipstick 72a to the engine. Accordingly, dipstick 72a must be twisted to secure and remove it from the engine. Sensing unit 60 and dipstick tube 70 and dipstick 72a are sized and arranged in the engine such that when dipstick 72a is secured in the dipstick tube 70 and float 20 is free floating, notch spaces 74 will overlap the height range of tabs 44.

In the case where the sensor recognizes a low fluid condition, float 20 will descend post 3, the engine ignition circuit to ground and be caught by the sensor retention mechanism. The engine operator will then remove dipstick 72a in order to visually check the level of oil on the dipstick and confirm that the engine shut-off is due to activation of the sensor. In this second embodiment merely removing the dipstick will not automatically lift the float from its caught position. In addition to this step, the operator must also proceed to add additional fluid to the fluid reservoir 65 and re-insert the dipstick. After additional fluid is added to the reservoir dipstick 72a is re-inserted into dipstick tube 70 and twisted in clockwise fashion for final placement. When this twisting occurs, face edges 75 engage and press against tab ends 45 and rotate float 20 in an ascent-causing direction. This ascent-causing rotating force provides force sufficient to lift the float from its caught position. As dipstick tube 72a continues to move downward into final position, tabs 44 slide up distal end 73 of dipstick 72a until they meet notches 74. Once tabs 44 meet notches 74, tab ends 45 disengage from the distal end 73 of dipstick 72a and face edges 75 cease imparting ascent-causing rotating force to tabs 44. Upon disengagement float 20 is free to float upon the newly added fluid in reservoir 65.

Accordingly, it is to be appreciated that in the second disclosed embodiment, the float 10 is released only after fluid has been added to the reservoir 65 and the dipstick 72a has been reinserted and twisted into place. Were the sensor to release the float in advance of the addition of fluid, gravity will cause the float to drop to the "caught" position. It is not until fluid is added to the reservoir beyond the pre-determined dangerously low oil level that the float will be prevented from returning to the "caught" position. However, because the catch mechanism can hold the float in the face of buoyant forces, merely adding fluid to the reservoir will not permit restarting the engine. After sufficient oil is added to the reservoir, the dipstick must be reinserted into the dipstick tube and on into the sensor. Then, the dipstick must, be twisted in place in order to lift the float from its "caught" position and allow it to float on the now sufficient level of oil. Accordingly, screw threads 4 provide mechanical lift to the float 20 when dipstick 72a is screwed down and locked in place and thereby ensure a positive reset of the low level sensor.

Figure 15:
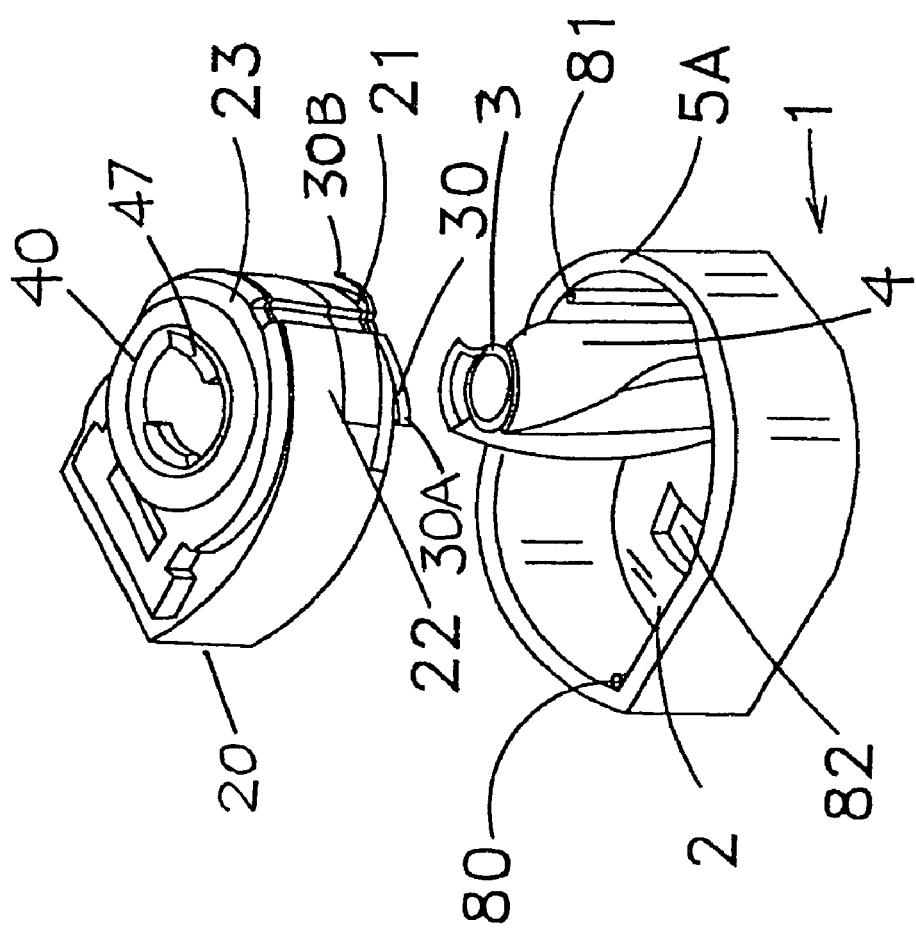
FIG. 15 is a view of the float separated from another embodiment of the base of the present invention in which the sidewall encompasses the floor of the base.

By forming the sensing unit to fit within a wall pocket of the reservoir, the need to have sidewall 5 completely encompass the floor 2 of base 1 is eliminated. However, for reservoirs whose walls do not have pocket spaces that provide protection from fluid turbulence, base 1 could be formed with sidewall 5a as a continuous perimeter wall encompassing the post 3 as is shown in FIG. 15. As shown in this figure, sidewall 5a includes first and second circuit terminal contacts 80, 81. For the sensor embodiment in which the latch spring is tangentially attached to the float, terminal contact 80 is connected to the engine ignition circuit and terminal contact 81 is connected to ground, though this circuit connecting arrangement could be modified at the option of the engine manufacturer. The float described previously would remain the same in this embodiment of the sensor. Electrically conductive latch spring 30, with a first end 30a and a second end 30b, is attached, to the float 20 in tangential fashion. Due to the communication between the external threads 4 of post 3 and the internal projections on the sleeve of the float 20, float 20 rotates as it travels along post 3 in response to the buoyant forces acting upon it. In this alternate embodiment, when float 20 drops to a level predetermined to represent a dangerously low level of fluid, the first end 30a of the latch spring 30 will contact first terminal 80 in the sensor base. At the same time, the second end 30b of latch spring 30 will contact second terminal contact 81 in the sensor base. As a result of this simultaneous contacting of the terminals by the latch spring, the ignition circuit will become grounded and cause the engine to stop running. This sensor embodiment may be adapted such that in addition to, or as an alternative to, grounding the engine, the simultaneous contacting of the terminal contacts by the latch spring will cause an indicator circuit to activate and alert the operator to the low fluid condition.

Figure 16:
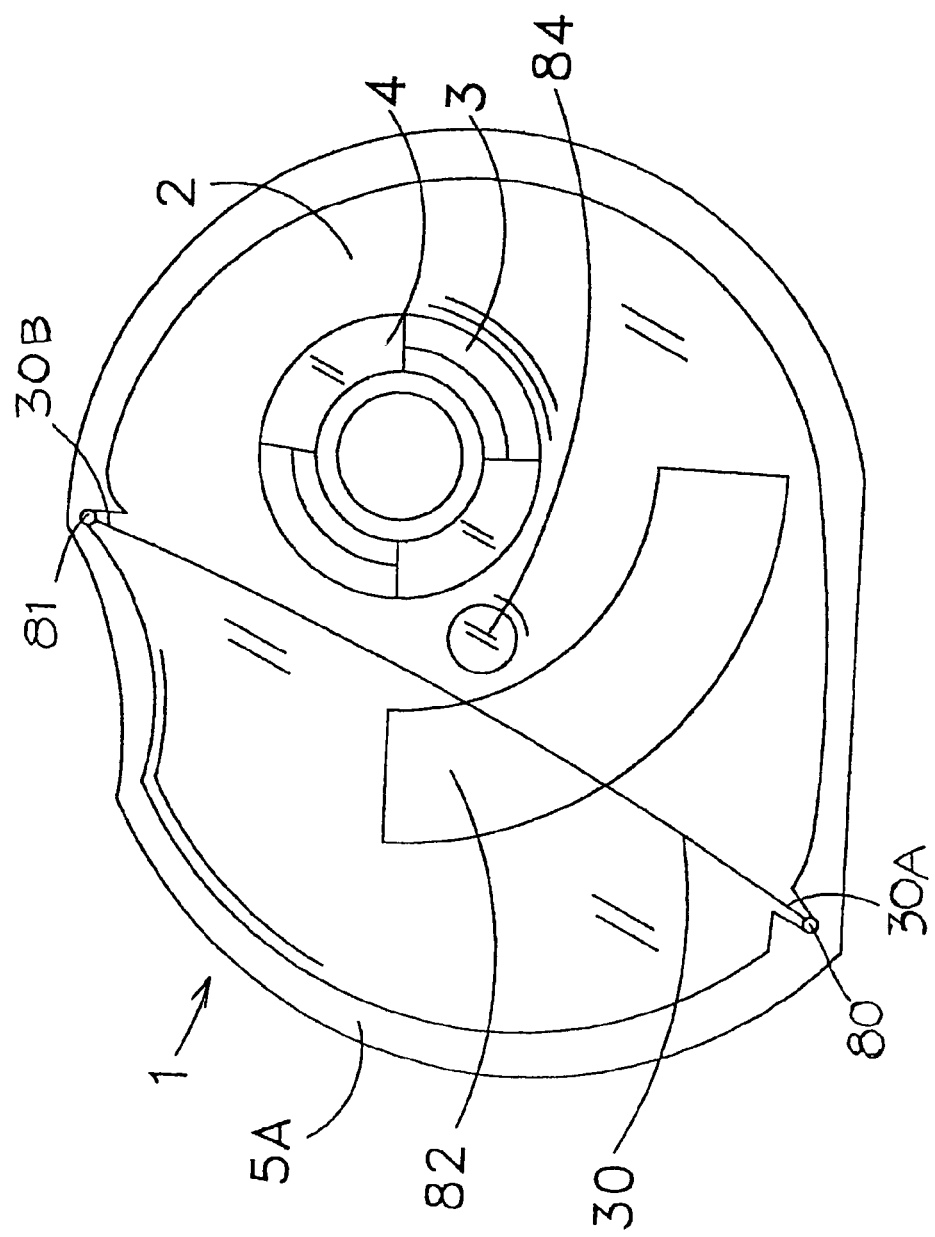
FIG. 16 is an overhead view of the embodiment of the base shown in FIG. 15 with a sidewall that encompasses the floor of the base, an arcuate slot to guide movement of the float and with a latch spring with fixed ends.
Figure 17:
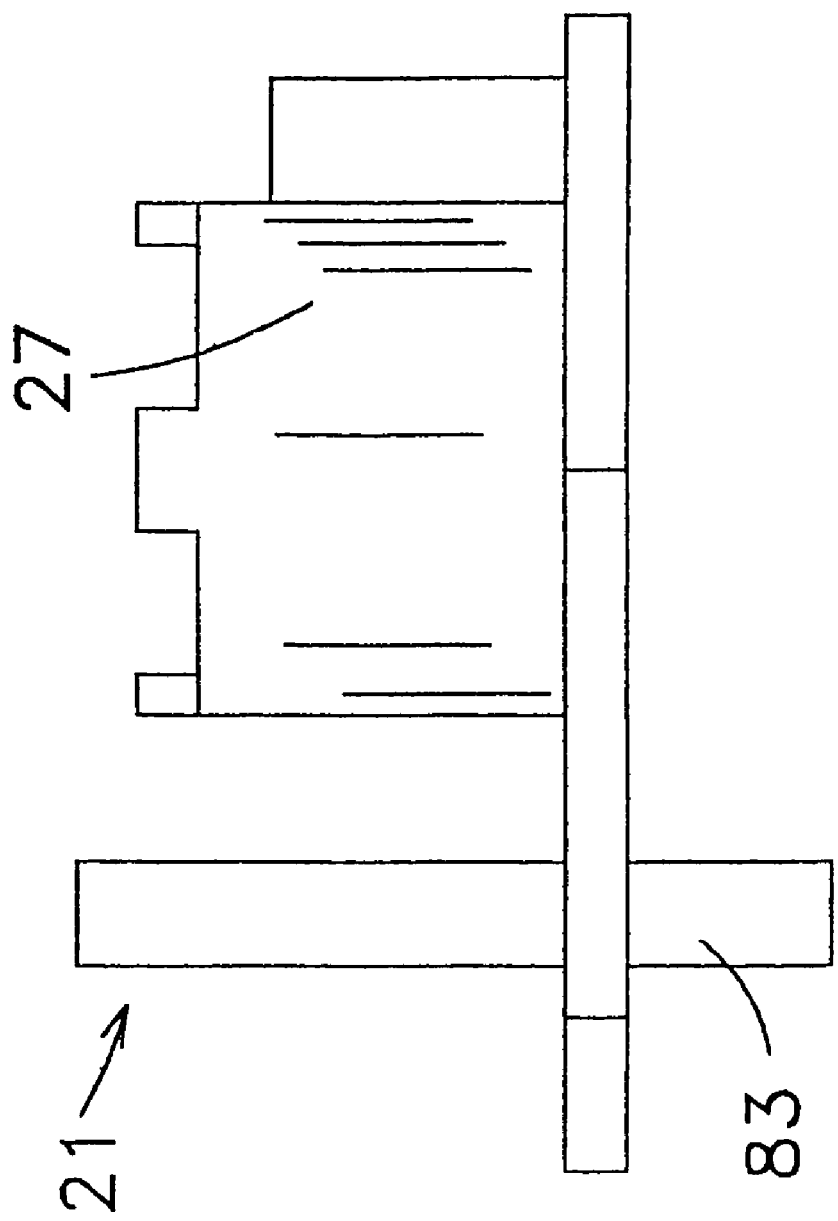
FIG. 17 is a perspective view of another embodiment of the float of the present invention with a descending guide pin adapted to move within the arcuate slot of FIGS. 15 and 16.

As shown in FIGS. 15 and 16, floor 2 of base 1 can be provided with an arcuate slot 82. Slot 82 is adapted to receive the guide pin 83 extending down from the base footing 25 of lower float housing 21 and shown in FIG. 17. The incorporation of guide pin 83 (shown in FIG. 17) and arcuate slot 82 into the sensing unit 60 operates to smooth the rotational motion of float 20 and further restrict the transverse movement of float 20 due to fluid turbulence.

Though the tangentially attached, orbiting latch spring serves well as a circuit contacting method, other arrangements may be employed to take advantage of the novel utilization of the rotary movement of the float. One such embodiment takes advantage of the arcuate slot and guide pin arrangement described and shown in FIGS. 16 and 17. Here, latch spring 30 is positioned underneath floor 2 with its ends 30a, 30b fixed on the sensor base. These ends are fixed to terminals 80, 81 respectively. One of these terminals is, in turn, connected to the ignition circuit or to ground. As can be seen from the overhead view of FIG. 16, in this embodiment latch spring 30 transects the rotational path of float 20. A conductive terminal post 84 projects downward from the underside of floor 2 and is positioned within the extension range of latch spring 30. As float 20 moves downward and undergoes descent-based rotation, guide pin 83 moves rotationally into latch spring 30 and push it towards post 84. When float 20 reaches the level pre-determined to represent a dangerously low level of fluid, guide pin 83 will push latch spring 30 into contact with post 84. Post 84 is a terminal contact connected to the ignition circuit or to ground, depending upon the circuit connecting arrangement chosen for ends 30a, 30b and terminals 80, 81. Accordingly, when latch spring 30 is pushed into contact with post 84, the ignition circuit will ground. When the sensor is reset and guide pin 83 moves away from post 84, the spring memory of latch spring 30 will cause it to disengage from, and break electrical contact with, post 84. This sensor embodiment may be adapted such that in addition to, or as an alternative to, grounding the engine, the contacting of the terminal post 84 by latch spring 30 will cause an indicator circuit to activate and alert the operator to the low fluid condition.

Figure 18:
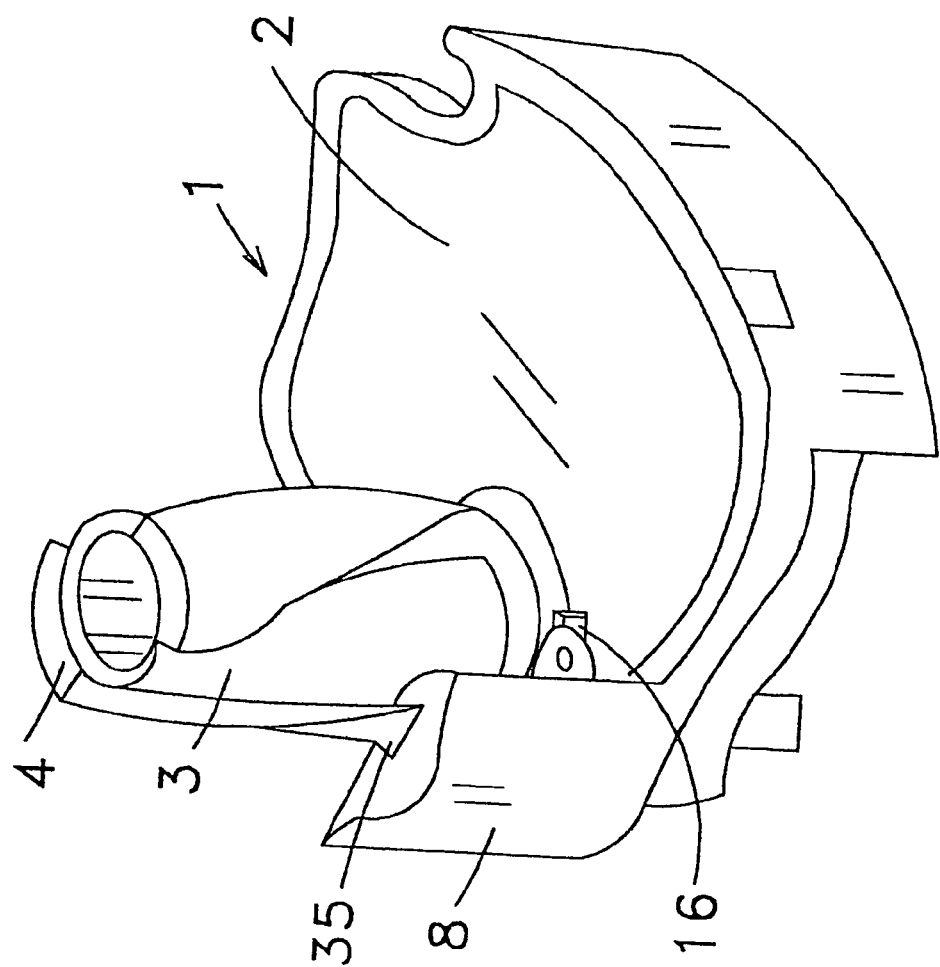
FIG. 18 depicts another embodiment of the sensor base designed for use as a start-up fluid level sensor.

The sensor may also be simplified to provide engine start-up monitoring only and prevent engine start-up in the face of a dangerously low fluid condition. In this embodiment shown in FIG. 18, the sidewall of the base is removed. If the fluid level is sufficient the ignition circuit will function normally when engine start-up is attempted. If, on the other hand, fluid level is low, then by virtue of the height of the float, the latch spring will be in a ground position and attempts to start the engine will be of no avail. However, with the sidewall removed and the sensor is located near the slinger, the force of the lubricant flung from the slinger gear or paddle is sufficient to lift the float and keep it above the level pre-determined to represent a dangerous level. Hence, this embodiment provides only engine start-up protection and would not be used for continuous fluid level monitoring during engine operation.

As noted, the terminals in the sensor base of the various embodiments can be alternatively or additively connected to an audible or visual alarm circuit. In this variant of the invention the contacting of the terminals by the latch spring would cause the activation of an alarm in addition to or instead of grounding the ignition circuit. Further, the construct of the invention may be further varied depending on a number of factors, such as the size of the sensor and its component parts and the composition of its component parts. Though the present invention has particular application in sensing lubricating fluid levels in engines, the invention may also be used to detect the level of any type of fluid levels in any type of container or reservoir. Accordingly, while specific embodiments have been shown and described, many variations are possible. The shape of the sensor and its components may be changed as desired to suit the equipment with which it is used. Those of ordinary skill in the art will appreciate that the invention can be carried out with various other minor modifications from that disclosed herein, and same is deemed to be within the scope of this invention.

What is claimed is:

1. A fluid level sensing apparatus for use in an internal combustion engine, the engine having a fluid reservoir, comprising:
   a base mounted in the fluid reservoir, the base having a sidewall and a helically threaded post;
   a terminal contact connected to a circuit;
   a float having a guide sleeve with internal projections,
   a latch spring having a first end and a second end;
   the float being buoyant and slidably mounted upon the threaded post such that the float rotates about the post in one direction as it moves along the post in response to an increase in fluid level in the reservoir and rotates in the other direction as it moves along the post in response to a decrease in fluid level in the reservoir; and
   wherein when the float reaches a pre-determined level on the post, the rotational motion of the float moves the latch spring into contact with the terminal contact.

2. The fluid level sensing apparatus of claim 1 wherein the circuit comprises an ignition circuit for the engine and the contacting of the terminal contact by the latch spring causes the engine to cease operation.

3. The fluid level sensing apparatus of claim 1 wherein the circuit comprises an alarm or indicator circuit and the contacting of the terminal contact by the latch spring activates an audible or visible alarm, or both.

4. The fluid level sensing apparatus of claim 1 wherein the float is mounted eccentrically upon the threaded post.

5. The fluid level sensing apparatus of claim 1 wherein the float is lobe shaped.

6. The fluid level sensing apparatus of claim 1 wherein when the float reaches the pre-determined level the sensor restrains the float from rotational movement.

7. The fluid level sensing apparatus of claim 6 wherein the engine has a dipstick tube and a dipstick and the combined actions of extracting the dipstick from the dipstick tube, adding fluid to the fluid reservoir and re-inserting the dipstick in the dipstick tube releases the float from its restrained position and resets the sensing apparatus.

8. The fluid level sensing apparatus of claim 1 wherein the terminal contact is connected to the ignition circuit, the fluid reservoir has a housing wall, the latch spring is mounted to the float and the first end of the latch spring remains in contact with the housing wall as the float rotates about the post.

9. The fluid level sensing apparatus of claim 1 wherein each end of the latch spring is fixed.

10. The fluid level apparatus of claim 1 wherein the base further comprises a floor, the floor having an arcuate slot adapted to receive a guide pin descending from the float.

11. A fluid level sensing apparatus for use in an internal combustion engine, the engine having a fluid reservoir, comprising:
    a base mounted in the fluid reservoir, the fluid reservoir having a housing wall and the base having a sidewall and a helically threaded post;
    a terminal contact connected to a circuit;
    a float having a guide sleeve with internal projections and a latch spring;
    the float being buoyant and slidably mounted upon the threaded post such that the float rotates about the post in one direction as it moves along the post in response to an increase in fluid level in the reservoir and rotates in the other direction as it moves along the post in response to a decrease in fluid level in the reservoir;
    the latch spring having a first end and a second end and the first end of the latch spring remains in contact with the housing wall of the fluid reservoir as the float rotates about the post; and
    wherein when the float reaches a pre-determined level on the post, the second end of the latch spring contacts the terminal contact.

12. The fluid level sensing apparatus of claim 11 wherein the circuit comprises an ignition circuit for the engine and the contacting of the terminal contact by the second end of the latch spring causes the engine to cease operation.

13. The fluid level sensing apparatus of claim 11 wherein the circuit comprises an alarm or indicator circuit and the contacting of the terminal contact by the second end of the latch spring activates an audible or visible alarm, or both.

14. The fluid level sensing apparatus of claim 11 wherein the float is mounted eccentrically upon the threaded post.

15. The fluid level sensing apparatus of claim 11 wherein the float is lobe shaped.

16. The fluid level apparatus of claim 11 wherein the base further comprises a floor, the floor having an arcuate slot adapted to receive a guide pin descending from the float.

17. The fluid level sensing apparatus of claim 11 wherein when the float reaches the pre-determined level the sensor restrains the float from rotational movement.

18. The fluid level sensing apparatus of claim 17 wherein the engine has a dipstick tube and a dipstick and the combined actions of extracting the dipstick from the dipstick tube, adding fluid to the fluid reservoir and re-inserting the dipstick in the dipstick tube releases the float from its restrained position and resets the sensing apparatus.

19. A fluid level sensing apparatus for use in an internal combustion engine, the engine having a fluid reservoir, comprising:
    a base mounted in the fluid reservoir, the base having a floor, a sidewall encompassing the floor, a first terminal contact, a second terminal contact and a helically threaded post mounted on the floor of the base;

a float having a guide sleeve with internal projections and a latch spring, the latch spring having a first end and a second end;

the float being buoyant and slidably mounted upon the threaded post such that the float rotates about the post in one direction as it moves along the post in response to an increase in fluid level in the reservoir and rotates in the other direction as it moves along the post in response to a decrease in fluid level in the reservoir; and wherein when the float reaches a pre-determined level on the post, the first end of the latch spring contacts the first terminal contact and the second end of the latch spring contacts the second terminal contact.

20. The fluid level sensing apparatus of claim 19 wherein one or more of the terminal contacts is connected to an ignition circuit for the engine and the contacting of the terminal contacts by the ends of the latch spring causes the engine to cease operation.

21. The fluid level sensing apparatus of claim 19 wherein the one or more of the terminal contacts is connected to an alarm or indicator circuit and the contacting of the terminal contacts by the ends of the latch spring activates an audible or visible alarm, or both.

22. The fluid level sensing apparatus of claim 19 wherein the float is mounted eccentrically upon the threaded post.

23. The fluid level sensing apparatus of claim 19 wherein the float is lobe shaped.

24. The fluid level apparatus of claim 19 wherein the base further comprises a floor, the floor having an arcuate slot adapted to receive a guide pin descending from the float.

25. The fluid level sensing apparatus of claim 19 wherein when the float reaches the pre-determined level the sensor restrains the float from rotational movement.

26. The fluid level sensing apparatus of claim 25 wherein the engine has a dipstick tube and a dipstick and the combined actions of extracting the dipstick from the dipstick tube, adding fluid to the fluid reservoir and re-inserting the dipstick in the dipstick tube releases the float from its restrained position and resets the sensing apparatus.

27. A fluid level sensing apparatus comprising:
a base adapted for mounting in a fluid reservoir, the base having a sidewall, and a helically threaded post;
a float having a sleeve with internal projections; and
the float being buoyant and slidably mounted upon the threaded post such that the float rotates about the post in one direction as it moves along the post in response to increase in fluid level in the reservoir and rotates in the other direction as it moves along the post in response to a decrease in fluid level in the reservoir.

28. The fluid level sensing apparatus of claim 27 wherein the float is mounted eccentrically to the helical post.

29. The fluid level sensing apparatus of claim 27 wherein the float is lobe shaped.

30. A fluid level sensing apparatus comprising:
a base adapted for mounting in a fluid reservoir, the base having a floor, a sidewall encompassing the floor, and a helically threaded post mounted on the floor of the base;
a float having a sleeve with internal projections and; and
the float being buoyant and slidably mounted upon the threaded post such that the float rotates about the post in one direction as it moves along the post in response to increase in fluid level in the reservoir and rotates in the other direction as it moves along the post in response to a decrease in fluid level in the reservoir.

31. The fluid level sensing apparatus of claim 30 wherein the float is mounted eccentrically to the helical post.

32. The fluid level sensing apparatus of claim 30 wherein the float is lobe shaped.

33. A fluid level sensing apparatus for use in an internal combustion engine, the engine having a fluid reservoir and an ignition circuit, comprising:
a base mounted in the fluid reservoir, the base having a wall segment, a helically threaded post;
a terminal contact connected to the ignition circuit;
a float having a sleeve with internal projections and a latch spring with a first end and a second end;
the float slidably mounted upon the threaded post such that the float rotates about the post in one direction as it moves along the post in response to increase in fluid level in the reservoir and rotates in the other direction as it moves along the post in response to a decrease in fluid level in the reservoir; and
wherein when the float reaches a pre-determined level on the post, the rotational motion of the float moves the latch spring into contact with the terminal contact and grounds the ignition circuit.

34. A fluid level sensing apparatus for use in an internal combustion engine, the engine having a fluid reservoir, comprising:
a base mounted in the fluid reservoir and having a helically threaded post;
a terminal contact connected to a circuit;
a float having a guide sleeve with internal projections;
a latch spring having a first end and a second end;
the float being buoyant and slidably mounted upon the threaded post such that the float rotates about the post in one direction as it moves along the post in response to an increase in fluid level in the reservoir and rotates in the other direction as it moves along the post in response to a decrease in fluid level in the reservoir; and
wherein when the float reaches a pre-determined level on the post, the rotational motion of the float moves the latch spring into contact with the terminal contact.

35. A method of shutting down an engine, the engine having an ignition circuit and a fluid reservoir, the method comprised of:
providing a base mounted in the fluid reservoir, the base having a sidewall, a helically threaded post and a terminal contact connected to the ignition circuit;
providing a buoyant float, the buoyant float having a guide sleeve with internal projections and being slidably mounted upon the threaded post such that the float rotates about the post in one direction as it moves along the post in response to increase in fluid level in the reservoir and rotates in the other direction as it moves along the post in response to a decrease in fluid level in the reservoir;
providing a latch spring, the latch spring having a first end and a second end; and
grounding the ignition circuit by moving the latch spring into contact with the terminal contact using only the buoyancy-based rotational motion of the float to move the latch spring.

36. The method of claim 35 further comprising restraining the float from further rotational movement once the latch spring contacts the contact terminal.

37. A method of alerting an engine operator to a low fluid condition in the engine, the engine having a alarm circuit and a fluid reservoir, the method comprised of:
providing a base mounted in the fluid reservoir, the base having a sidewall, a helically threaded post and a terminal contact connected to the alarm circuit;

providing a buoyant float, the buoyant float having a guide sleeve with internal projections and being slidably mounted upon the threaded post such that the float rotates about the post in one direction as it moves along the post in response to increase in fluid level in the reservoir and rotates in the other direction as it moves along the post in response to a decrease in fluid level in the reservoir;

providing a latch spring, the latch spring having a first end and a second end; and activating the alarm circuit by moving the latch spring into contact with the terminal contact using only the buoyancy-based rotational motion of the float to move the latch spring.

38. The method of claim 37 further comprising restraining the float from further rotational movement once the latch spring contacts the contact terminal.

39. A method of grounding an engine ignition circuit in response to a low fluid condition and then restoring the ignition circuit's ignition capability, the engine having an ignition circuit, a fluid reservoir, a dipstick tube and dipstick, the method comprised of:

providing a base mounted in the fluid reservoir, the base having a sidewall, a helically threaded post and a terminal contact connected to the ignition circuit;

providing a buoyant float, the buoyant float having a guide sleeve with internal projections and being slidably mounted upon the threaded post such that the float rotates about the post in one direction as it moves along the post in response to increase in fluid level in the reservoir and rotates in the other direction as it moves along the post in response to a decrease in fluid level in the reservoir;

providing a latch spring, the latch spring having a first end and a second end;

providing a second terminal contact leading to electrical ground;

rotating the float using only the buoyancy forces from the fluid in the reservoir such that at a pre-determined level of fluid in the reservoir the latch spring makes simultaneous contact with the first terminal contact and the second terminal contact;

restraining the float from further rotational movement once the latch spring contacts the contact terminals; and extracting the dipstick from the dipstick tube, adding fluid to the fluid reservoir and re-inserting the dipstick in the dipstick tube.

\* \* \* \* \*